(12) United States Patent
Potucek et al.

(10) Patent No.: US 9,786,002 B2
(45) Date of Patent: Oct. 10, 2017

(54) SYSTEM AND METHOD FOR PRESENTING A SALES DEMONSTRATION USING A POOL/SPA CONTROLLER USER INTERFACE

(71) Applicant: Hayward Industries, Inc., Elizabeth, NJ (US)

(72) Inventors: Kevin Potucek, Far Hills, NJ (US); Gregory Fournier, West Kingston, RI (US); Jason DeBruin, Brick, NJ (US); Bruce Porter, Rockaway, NJ (US); Michael Massa, Mountainside, NJ (US)

(73) Assignee: Hayward Industries, Inc., Elizabeth, NJ (US)

(*) Notice: Subject to any disclaimer, the term of this patent is extended or adjusted under 35 U.S.C. 154(b) by 0 days.

(21) Appl. No.: 14/228,689

(22) Filed: Mar. 28, 2014

(65) Prior Publication Data

US 2015/0278930 A1 Oct. 1, 2015

Related U.S. Application Data

(60) Provisional application No. 61/970,935, filed on Mar. 27, 2014.

(51) Int. Cl.
*G06Q 30/00* (2012.01)
*G06Q 30/06* (2012.01)

(52) U.S. Cl.
CPC ..... *G06Q 30/0641* (2013.01); *G06Q 30/0623* (2013.01)

(58) Field of Classification Search
CPC .................................. G06Q 30/0601–30/0645
USPC ......................... 705/26.1–27.2; 345/419–689
See application file for complete search history.

(56) References Cited

U.S. PATENT DOCUMENTS

| | | | |
|---|---|---|---|
| 2003/0061284 A1* | 3/2003 | Mandarino et al. | 709/204 |
| 2003/0090484 A1* | 5/2003 | Comair | G06T 13/60 345/420 |
| 2005/0088434 A1* | 4/2005 | Potucek | G09F 19/22 345/214 |

(Continued)

OTHER PUBLICATIONS

Zodiac pool systems to debut its most energy efficient pool system at international pool, spa and patio expo in new orleans. (Oct. 31, 2012). PR Newswire Retrieved from https://dialog.proquest.com/professional/professional/docview/1125252410?accountid=142257.*

(Continued)

*Primary Examiner* — Resha Desai
(74) *Attorney, Agent, or Firm* — McCarter & English, LLP

(57) ABSTRACT

A system and method for presenting a sales demonstration using a user interface of a pool/spa controller is provided. A first device includes a system controller user interface and sends data to a second device. The second device processes the data to present a media presentation which exhibits systems, associated features, and their ability to be controlled via a controller. A user can control pool and/or spa equipment using the first device, and the user's input can guide a presentation on the second device, which demonstrates corresponding features of such equipment. As such, the natural connections among a user, a controller, and an associated feature are demonstrated in a sales-effective manner. Additionally, the first device can present a user with a simulation of a control system interface to allow for effective sales of products.

19 Claims, 20 Drawing Sheets

(56) References Cited

U.S. PATENT DOCUMENTS

| | | |
|---|---|---|
| 2005/0288821 A1 | 12/2005 | Laflamme |
| 2007/0288331 A1* | 12/2007 | Ebrom .................... D06F 33/02 705/27.1 |
| 2008/0021685 A1* | 1/2008 | Emery .................... C02F 1/008 703/9 |
| 2008/0071645 A1 | 3/2008 | Latsoudis |
| 2008/0109312 A1 | 5/2008 | Ebrom et al. |

OTHER PUBLICATIONS

International Search Report dated Aug. 25, 2014, issued in connection with International Application No. PCT/US14/32145 (3 pages).
Written Opinion of the International Searching Authority dated Aug. 25, 2014, issued in connection with International Application No. PCT/US14/32145 (4 pages).

* cited by examiner

SYSTEM AND METHOD FOR PRESENTING A SALES DEMONSTRATION USING A POOL/SPA CONTROLLER USER INTERFACE

CROSS-REFERENCE TO RELATED APPLICATIONS

This application claims priority to U.S. Provisional Patent Application No. 61/970,935, filed on Mar. 27, 2014, the entire disclosure of which is expressly incorporated herein by reference.

BACKGROUND OF INVENTION

Field of the Disclosure

The present disclosure relates generally to a system and method for using a controller user interface to guide a presentation of sales material. More specifically, the present disclosure relates to a system and method for using a controller user interface to control a media presentation on a display device for demonstrating the controller as well as the systems which it can control.

Related Art

Automated systems (home automation systems, swimming pool and/or spa control systems, etc.) continue to become increasingly technologically advanced, as do their controllers.

A system's adaptive and user-friendly controller can now serve as a material factor for many customers while purchasing the system. Thus, when selling an automated system, it is beneficial to highlight the functionality of its related controller. For example, a potential customer may be attracted to a swimming pool heating system because the system's controller enables scheduling so as to set specific water temperatures throughout the course of a week. Another potential customer may be attracted to a swimming pool's underwater lighting system because the system's controller enables a user to choreograph a light show. Also, a potential customer may chose to install an entire pool infrastructure because the systems support an adaptive and user-friendly controller. For example, pool/spa controllers such as the Aqua-Logic controller provide a "plug-and-play" feature, such that when a user adds a feature to an existing pool/spa system, the user can also add to the existing controller additional functionality so to operate the feature.

However, while the controllability of automated systems has recently experienced vast improvements, and while it has become an increasingly more influential factor in customers' purchasing decisions, challenges exist in conveying these improvements during sales demonstrations. For example, swimming pools are still conventionally sold by a salesperson presenting photographs of four-color sell-sheets of pools and their many features. Also, most pool/spa controllers are conventionally sold in a similar way with four-color literature showing photographs of control features. While more progressive sales techniques include videos that run through features of a pool, these videos are not guided and thus present a large amount of footage irrelevant to a particular customer. Moreover, not only do these sales tactics fail to adequately display the capabilities of pool/spa features and their controllers, they do not take advantage of benefits that can be gained from in-person interaction between a salesperson and a prospective customer. Therefore, needed is a sales tool that can demonstrate innovative automated systems and their controllers available for purchase, and which leverages from interaction between a salesperson and a prospective customer.

SUMMARY OF THE INVENTION

The present invention relates to a system and method for using a controller user interface to control a media presentation on a display device, for selling equipment (e.g., pool and/or spa equipment and their associated controllers). A first device includes a system controller user interface and sends data to a second device. The second device processes the data to present a media presentation exhibiting systems, associated features, and their ability to be controlled via a controller. Thus, a user can control pool and/or spa equipment using the first device, and the user's input can guide a presentation on the second device, which demonstrates corresponding features of such equipment. As such, the natural connections among a user, a controller, and an associated feature are demonstrated in a sales-effective manner. Additionally, the first device can present a user with a simulation of a control system interface; thus, in instances where a potential customer does not currently own a particular automated system, the simulation allows for effective sales of such products.

BRIEF DESCRIPTION OF THE DRAWINGS

The foregoing features of the invention will be apparent from the following Detailed Description of the Invention, taken in connection with the accompanying drawings, in which.

DETAILED DESCRIPTION OF THE INVENTION

The present invention relates to a system and method for presenting a sales demonstration using a controller interface, as discussed in detail below in connection with FIGS. 1-20.

It should be understood at the outset that the embodiments of the present disclosure are exemplary, and while the foregoing examples describe pool and/or spa systems and controllers, the disclosed system and method can be utilized with any type of automated system and/or controller. For example, instead of or in addition to a pool/spa system, the disclosed system and method could be utilized with an automated system for controlling various features within a residence and/or a hotel room (lighting, temperature, music, heat, etc.), or for controlling various features of a business (e.g., restaurant), or for an automated assembly line (e.g., factory), or any other type of automated system. Also, those skilled in the art will appreciate that term "pool/spa system" used herein need not include both a pool and spa (e.g., the system could be used with a single pool or a single spa, or multiples thereof), and that a "pool/spa system" could include more than one pool and/or more than one spa.

Figure 1:
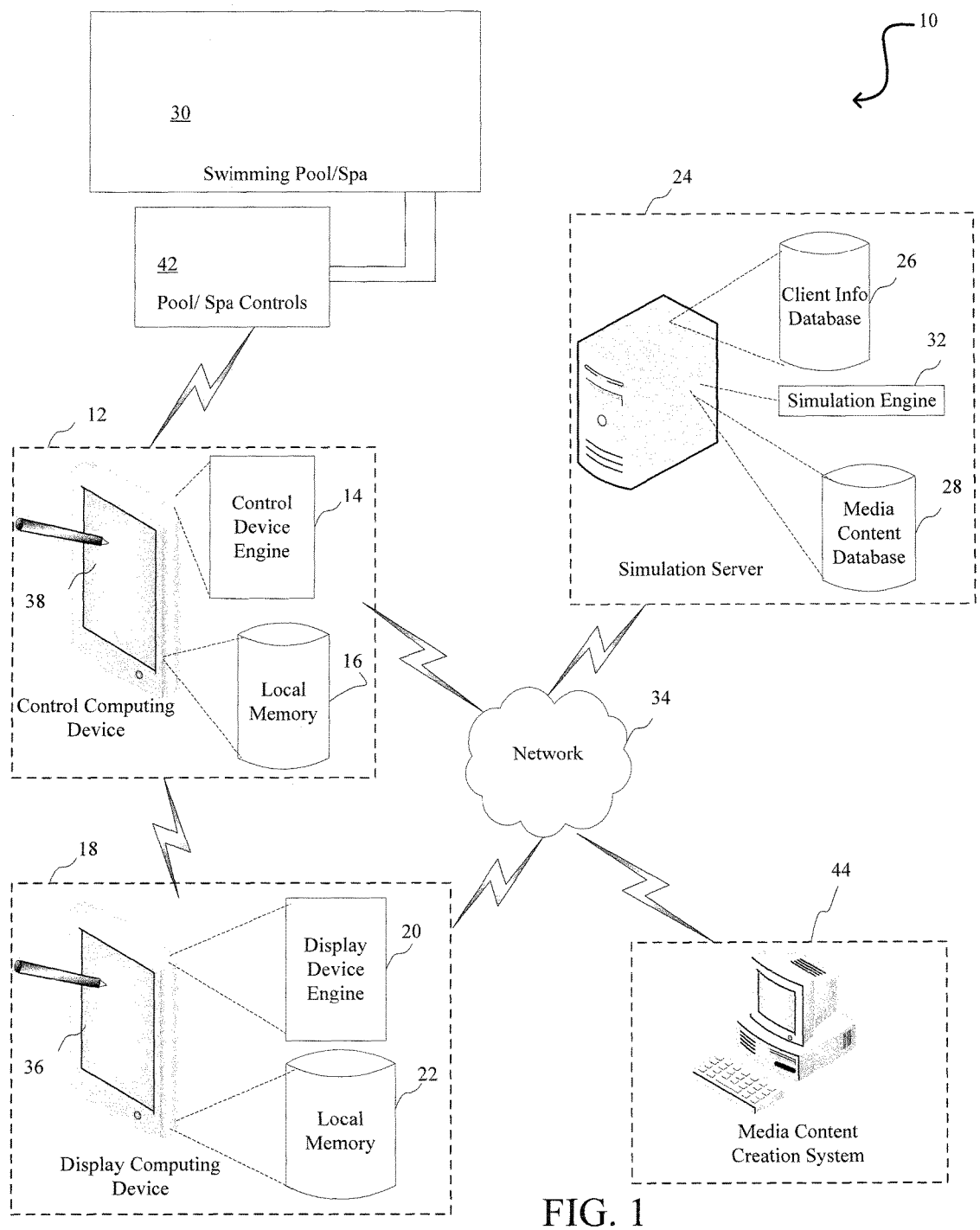
FIG. 1 is a diagram showing a general overview of the pool/spa control user interface sales system, including a control computing device, a display computing device, and a simulation server that is accessible via a network.

FIG. 1 is a diagram showing a general overview of a system 10 for guiding sales presentations through a pool controller user interface. The system 10 includes a control computing device ("first device") 12 and a display computing device ("second device") 18. The first device 12 could include a display screen 38, a control device engine 14, and a control device local memory 16. The second device 18 could include a display screen 36, a display device engine 20, and a display device local memory 22. The first device 12 could communicate with the second device 18 through any means, such as through wireless communication means (e.g., tethering (via WiFi (IEEE 802.11), Bluetooth, etc.), 3G, 4G, RF communication), through a physical connection, or any combination thereof.

A simulation software application could cause the first device 12 to present a simulation control user interface 40 (see FIGS. 2-4, 9-11, & 13-14) that simulates a pool/spa controller user interface. As such, the first device's 12 display screen 38 could present graphics as shown on a pool/spa controller's display screen, and a user could input data into the first device 12 just as a user would input data into an existing pool/spa controller. The data received by the simulated control user interface 40 could be transmitted to the second device 18 for causing the second device 18 to present media presentations correlating to the received data. As such, when a user activates a "lights on" button on the simulation control user interface 40, such input would cause the second device 18 to present a media presentation demonstrating a pool's "lights on" functionality, for example, by showing a video of a swimming pool's lights turning on. Therefore, because the present disclosure enables a potential customer to interact with a pool/spa controller user interface and experience the capabilities brought about by such interaction, a potential customer is more inclined to purchase the pool/spa controller and related pool/spa system features. It is noted that the first device 12 and the second device 18 could be the same device such that a single device provides the functionality disclosed herein (e.g., one device can be used both to control pool/spa equipment and to simulate display of a corresponding sales presentation).

In some embodiments, the first device 12 is a pool/spa controller itself, which controls an existing pool/spa controls 42 of a swimming pool and/or spa 30. In such cases, the first device 12 could be a customer's own pool/spa controller but it need not be (e.g., a salesperson could bring the pool/spa controller to the customer). In cases where a customer already has a pool/spa controller that is remote control (e.g., a mobile tablet, smart-phone, laptop) for communicating with the pool/spa controls 42 and/or with the systems themselves, the first device 12 could be such a remote control. Thus, the sales person could use the customer's own remote control to guide a media presentation relating to new products that are compatible with the customer's own pool/spa controller. In turn, the potential customer could experience "what it would be like" to own and control additional features and, therefore, would become more inclined to purchase those features.

In cases where the first device 12 is a functioning pool/spa controller, a simulation software application could cause the first device 12 to enter a "simulation mode" wherein data inputted into the first device 12 is transmitted to the second device 18 instead of, or in addition to, being transmitted to the pool/spa system itself.

The simulation software could cause the first device's 12 user interface to simulate that of various pool/spa controllers. For example, if a salesperson desires to demonstrate two different pool/spa controllers to a potential customer, the salesperson could first configure the first device 12 to simulate a first pool/spa controller and carry out a first demonstration. Thereafter, the salesperson could reconfigure the first device 12 to simulate a second pool/spa controller to carry out a second demonstration. Thus, a potential customer may interact with several controllers and chose the one which he or she most prefers (e.g., one customer may like a controller because it is more navigable while another customer may prefer a different controller because it enables more fine-tuning of technical systems, etc.).

Instead of or in addition to causing the first device's 12 user interface to simulate that of various pool/spa controllers, the simulation software could enable reconfiguration of a particular pool/spa controller's simulated user interface 40. The simulation software could allow buttons and/or functionalities for a particular simulation user interface 40 to be added, removed, and/or modified. For example, if a customer owns a pool that includes lights but not colored lights, then the customer's pool/spa controller would already have a user interface having a "lights" button with on/off functionality, but it would not have a "colored lights" functionality. However, upon the simulation software causing the first device 12 to be in a "simulation mode," the simulated control user interface 40 could include a colored lights functionality. As such, upon a user activating the "lights" button, the software would prompt a new screen to be displayed capable of receiving input for colored lights (e.g., a "deep blue" button, a "multi-colored lights" button, a "light show" button). The customer could then activate the "light show" button, which would cause the second device 18 to present a media presentation representing what a light show could look like if the customer were to purchase the colored lights product. Specifically, the second device 18 would display a media presentation of a swimming pool with colored lights performing the light show. Thus, although the customer would not yet have colored lights installed in his or her pool, the customer could experience the product.

In cases where a potential customer's own pool/spa controller is employed as the first device 12, the simulated control user interface 40 buttons and/or functionalities could interact with the pool/spa control 42 itself. Thus, the simulated control user interface 40 could communicate with an actuator interface for controlling pool/spa equipment such as heating systems, lighting systems, cleaners, chlorinators, sanitizers, pH controllers, ORP controllers, etc. For example, the activation of the "light show" button on the simulated control user interface 40 could invoke the light show media presentation on the second device 18, while also causing the customer's own white lights to turn on. Thus, the customer could compare his or her current pool lights to more desirable lights being offered for sale, and thus become more inclined to purchase the multi-colored lights.

Because the simulation software enables reconfiguration of the simulation control user interface 40, a salesperson can effectively tailor a sales pitch to each potential customer. The simulation software allows real-time modification of a simulation control user interface 40, as well as its buttons and functionalities. Thus, a salesperson can listen to a customer and create a customized sales presentation in the most effective manner.

For example, based on client records indicating a customer has children, a salesperson may enter into a sales meeting with the customer with the simulation control user interface 40 configured to include "kids party" theme and "kids party" light show buttons and functionalities. After speaking with the customer, the salesperson may discover that the children are away at school and the parents are not interested in any pool features directed towards kids. Thus, the salesperson can promptly reconfigure the simulation control user interface 40 to no longer include the "kids party" theme and "kids party" light show buttons and functionalities. Thus, the customer will have the opportunity to experience a pool/spa controller user interface specifically tailored to his or her own needs and preferences.

The second device 18 could be any type of device capable of presenting media content based on input received by the first device 12. The second device 18 could present media content based on transmissions received from the first device 12 and/or from one or more remote computer systems (e.g., the simulation server 24). The second device 18 could be a computer, a tablet, a smart-phone, a smart-television, etc. As noted above, the first device 12 and the second device 18 could be the same device.

The second device 18 could include at least one display screen 36 and at least one display device engine 20, which could be contained in one or more components. The display device engine 20 could stream media content to the display screen 36. Also, the display device engine 20 could be a component of the first device 12 and stream media content to the display screen 36.

The Media Presentations

The media presentations could be any type or types of media content (e.g., videos, applications, images, audio, etc.) for presentation on the display screen 36. Numerous presentations could be created to cater to clients of various demographics, interests, levels of expertise, etc. For example, some presentations for residential clients could present a residential pool/spa setting, while other presentations for corporate clients could present a hotel pool/spa setting for accommodating numerous guests. One "light show" media presentation could present an extravagant light show incorporating numerous lights, while another, simpler "light show" presentation could exhibit fewer lights which would cost less money. Also, a first "heater" presentation could demonstrate a heating system product with technical narrative directed to viewers with a high level of knowledge of pool heating systems, while a second "heater" presentation could demonstrate the same heating system product but in a less technical manner, for example, with a graphical representation (e.g., animation) depicting the heating system's ability to moderate the temperature at scheduled times throughout the day. Thus, multiple feature media contents could relate to various products available to potential customers, and an available product could have any number of presentations for its sales demonstrations.

The media presentations could comprise a "backdrop media content" and one or more "feature media contents." The second device 18 could present a "backdrop media content" contemporaneously with several "feature media contents." For example, a backdrop media content could comprise a backdrop video of a swimming pool, and feature media contents could include a first feature application presenting a lighting system for sale and a second feature application presenting a heating system for sale. A user (e.g., salesperson) could activate a "backdrop" button on the first device 12 to cause the backdrop video to play on the display screen 36. A user (e.g., potential customer) could then navigate through the simulation control user interface 40 and activate a "lights" button just as a user would on a pool/spa controller to cause pool-lights to turn on. When the backdrop video is playing and the "lights" button is activated, a lighting feature application is launched and the backdrop's swimming pool lights would appear to light up according to the lighting feature application. The feature application could have an application programming interface (API) capable of receiving input from the first device to control the feature media presentation. For example, through the first device 12, a user could direct "dimmer" controls on the simulation control user interface 40 to cause the lights to appear dimmer or brighter in the media presentation (just as a user could direct "dimmer" controls on an operating pool/spa controller to cause pool-lights to become dimmer or brighter). During or after the running of the lighting feature application, the user could then navigate through the simulation control user interface 40 and activate a "heater" button just as a user would on an operating pool/spa controller to control a pool/spa's installed heating system. When the backdrop video is playing and the "heater" button is activated, a heater feature application is launched to present graphical representations of heating components operating behind the backdrop swimming pool's walls. Through the control computing device 12, a user could communicate with the heater feature application's API to control the graphical representations. For example, the user could direct a "temperature" control on the simulation control user interface 40 to cause the heating components to appear to work at higher or lower capacities (just as a user could direct "temperature" controls on an operating pool/spa controller to cause the heaters to work at higher or lower capacities).

The media presentations could be stored in any storage component or device. For example, the media contents could be stored in the control device local memory 16, and/or in the display device local memory 22, and/or in any other memory (e.g., in a remote (e.g., cloud-based) media content database 28 run by the simulation server 24). In cases where presentations are stored in the control device local memory 16, the first device 12 could stream the content to the second device 18. In cases where presentations are stored in the display device local memory 22, the first device 12 and/or the simulation server 24 could transmit signals to the second device 18 prompting the second device 18 to play the stored presentations. In cases where presentations are stored in the remote media content database 28, the simulation server 24 could transmit the presentations to the second device 18, and/or the first device 12 could fetch the media contents from the media content database 28 and push the media contents to the second device 18, and/or the first device 12 could cause the second device 18 to retrieve the presentations from the media content database 28.

In cases where the presentations are stored in the display device local memory 22 and/or in the control device local memory 16, the presentations could be created and loaded into the local memories 22, 16 by any means. The presentations could be created on the first device 12 and/or created via the second device 18. The media contents could be loaded into the local memories 22, 16 through a physical connection (e.g., USB), and/or loaded from another device (e.g., loaded into the display device local memory 22 from the control device local memory 16 via tethering), and/or retrieved from an external source (e.g., retrieved wirelessly from a remote database).

In cases where the presentations are stored in the remote media content database 28, the presentations could be created and uploaded into the database 28 by way of any means. For example, the presentations could be created on the first device 12 and/or created on the second device 18. The presentations could also be created on a media content creation system 44. The media content creation system 44 could include the simulation server 24, or the media content creation system 44 could be a separate system in communication with the simulation server 24 (e.g., via network 34).

Selection of the Media Presentations

The system 10 could include a selection engine. The selection engine could be a component of the control device engine 20, the display device engine 14, the simulation engine 32 and/or a separate engine. The selection engine could process information to select one or more presentations for display on the second device 18.

The selection engine could select media presentations based on input received via the simulation control user interface 40. For example, buttons and/or controls on the simulation control user interface 40 could be associated with one or more presentations. Thus, based on a user activating a particular button and/or control, the selection engine could select a presentation for display on the second device 18.

The particular presentations that are associated with the buttons and controls could be selected by the salesperson. If the salesperson has an ongoing relationship with a particular customer, the salesperson might have a good sense as to which presentations would be most effective in selling products to the customer. For example, if the salesperson knows that a customer is a mechanical engineer, then the salesperson could configure the "heater" button to prompt a heater presentations that demonstrates the technical features of the heater's components with a high leveled narrative. On the other hand, if the salesperson believes the customer knows very little about engineering, then the salesperson could configure the "heater" button to prompt a heater presentations geared towards those with a low level of engineering knowledge and exhibiting how relaxing it can be to swim in a heated swimming pool. The preselection of the presentations could be accomplished on the first device 12, and/or on the second device 18, and/or from a different computing device. A series of presentation selection screens could guide the salesperson through the selection process. In selecting a presentation, the salesperson could chose a particular presentation by selecting a title from a list of titles.

While the media presentation selection could be performed before a sales demonstration, the selection could also be created and/or modified during a sales demonstration. For example, a salesperson may enter a sales meeting thinking that a customer has a very low level of engineering knowledge and thus configure the "heater" button to prompt the heater presentation highlighting relaxation experienced from heated pools. During the demonstration, however, the salesperson may come to learn that the customer is in fact highly skilled in the mechanical arts. Thus, while the second device 18 is playing the media presentation, the salesperson could return to configuration screens of the first device 12 and modify the "heater" functionality so that instead of prompting the layman presentation about relaxation, it prompts a highly technical presentation focused on the heating system's mechanical underpinnings.

Data relating to a particular customer could be stored in a client information database 26. For example, data-tags associating a particular client with a "high level" of engineering knowledge could be stored in the client information database 26 and later processed by the selection engine 30 to select presentations. A particular customer's client information could later be retrieved from the client information database 26 upon the selection engine 30 identifying the customer. The selection engine 30 could identify a customer by a user sending data to the selection engine identifying the customer (e.g., a salesperson sending a message containing the customer's name to the selection engine via the first device 12 and/or the second device 18). Also, the selection engine 30 could identify a customer based on determining the location of the first device 12 and/or the second device 18 and associating such location with a particular customer (e.g., through GPS technology and/or through determining particular cell towers communicating with the first device 12 and/or the second device 18).

Each media presentation could be stored together with one or more data tags associating the media presentation with various criteria. For example, the high-skilled heater presentation could be stored together with data tags indicating "heater," the particular heater model identifier, "mid-price level," "technical narrative," "highly skilled customer," etc. When the selection engine identifies the particular customer and retrieves the associated client information from the client information database 26, and/or when the salesperson enters input into the first device 12 and/or the second device 18 indicating "heater," "mid-price level" and "highly skilled customer," the selection engine could select the high-skilled heater presentation as a selected heater presentation from a plurality of heater presentations. Thus, when the salesperson activates the "heater" button on the first device's 12 user interface, the high-skilled heater presentation would be presented on the second device 18. The selection engine could select a presentation based on the presentation having the most data tags that match the received user input and the client information. In the selection process, the selection engine could also consider other data tag criteria, such as the popularity of presentations, how long presentations have been available, etc. As a media presentation is presented on the display computing device 18, the salesperson could enter input invoking more presentations to be selected based on their data tags and thereby create the media presentation in real time as it is presented to the user. As such, as a sales meeting progresses and the salesperson learns more about the customer, the salesperson can generate and modify a media demonstration so to improve its efficacy. Therefore, the current system leverages from recent innovations in targeted advertisement technology, while also benefiting from timeless advantages gained through in-person sales meetings.

Presentation of the Media Contents

The media presentations could be any kind of media content for presentation on the second device 18 (e.g., videos, applications, graphical representations, images, audio, etc.). Prompting a "heating" button could prompt a video displaying a swimming pool's heating system, while prompting a "lighting" button could then prompt a separate video showing a swimming pool's lighting system. Also, prompting a "heating" button could prompt a first portion of a video displaying a swimming pool's heating system, while prompting a "lighting" button could prompt a second portion of the same video displaying the swimming pool's lighting system.

A media presentation could include a "backdrop media content" and one or more "feature media contents." The first device 12 could present a backdrop media content simultaneously with several feature media contents. For example, the backdrop content could be a backdrop video of a swimming pool, and feature media contents could be feature applications demonstrating various features of the swimming pool. The second device 18 could be configured to continue playing the backdrop video while launching feature applications. As such, each feature application could be presented contemporaneously with the backdrop video.

In addition or as an alternative to presenting the backdrop media content and feature media content contemporaneously, the backdrop media content and feature media content could be combined to create a combined media content for presentation on the display screen 36. For example, the display computing device engine 20, the control computing device engine 14, and/or another engine (e.g., the simulation engine 32) could process a backdrop video and one or more features videos to create a combined video for presentation on the display screen 36.

The presentation of the feature media content could be prompted based on whatever portion of the backdrop media content is displayed on the display screen 36. For example, if the display screen 36 is displaying a first particular portion of a swimming pool, then a heating feature media content could be prompted to play. Likewise, if the display screen 36 is displaying a second portion of the swimming pool, then a fountain feature media could be prompted to play. The backdrop media content could be an image, allowing a user to navigate over portions of the image (e.g., via touch-screen navigation) to prompt various feature media contents.

The media presentation could be played in an "auto-demonstration" mode, wherein the media presentation plays without the need for user input. Thus, a salesperson could activate an auto-demonstration "play" button, which would prompt a media presentation. The media presentation could include narrative and/or music, or it could present media presentations without audio.

The media presentation could be displayed on any number of display devices in addition to the second device 18. For example, the media presentation could be displayed on the first device 12.

Figure 2:
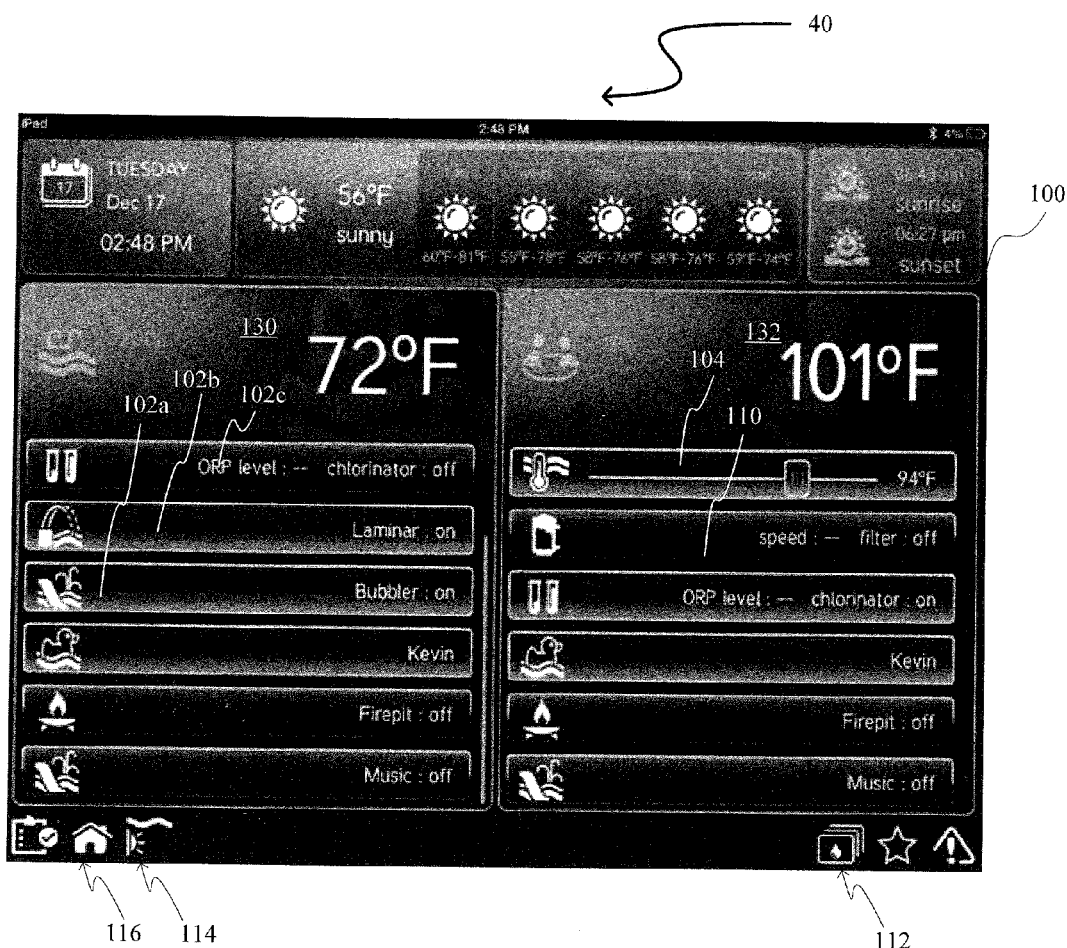
FIGS. 2-4, 9-11, & 13-14 show a simulated control user interface presented on a control computing device's display screen.
Figure 3:
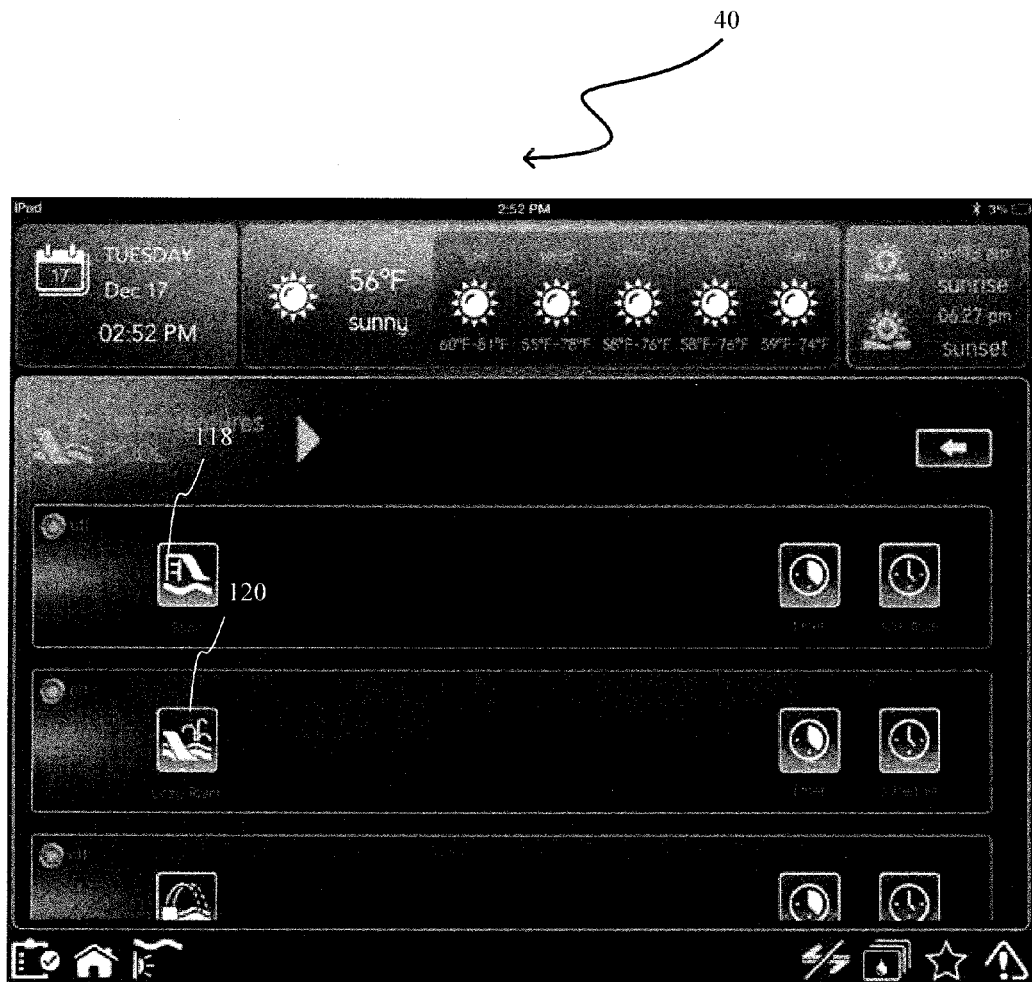
Figure 4:

FIG. 2 shows what a simulated control user interface 40 could look like. FIG. 2 shows a "home screen" 100 containing a plurality of buttons (e.g., 102*a*-102*c*, 110, 112, 114, 116) and a temperature control 104. Activation of a button could prompt the control computing device 40 to display another screen relating to the button. For example, tapping on the "pool water features" button 102*a* on the home screen 100, could prompt display of a "pool water features" screen, as shown in FIGS. 3 and 4. The "pool water features" screen could include buttons and/or controls, each associated with at least one pool water feature. For example, a slide button 118 associated with a water slide, a lazy river button 120 associated with a lazy river, a bubbler button 122 associated with a water bubbler, a waterfall button 124 associated with a waterfall, etc. The pool water features could also have related controls on the "pool water features" screen. For example, the waterfall functionality could have a control 126 to adjust the flow of a waterfall. When a user activates such buttons and/or controls, the first device 12 sends a message to the second device 18 to display a media presentation relating to whatever pool water feature is associated with the button and/or control.

Figure 5:
FIGS. 5-8, 12, & 15 show a media presentation presented on a display computing device's display screen.
Figure 6:
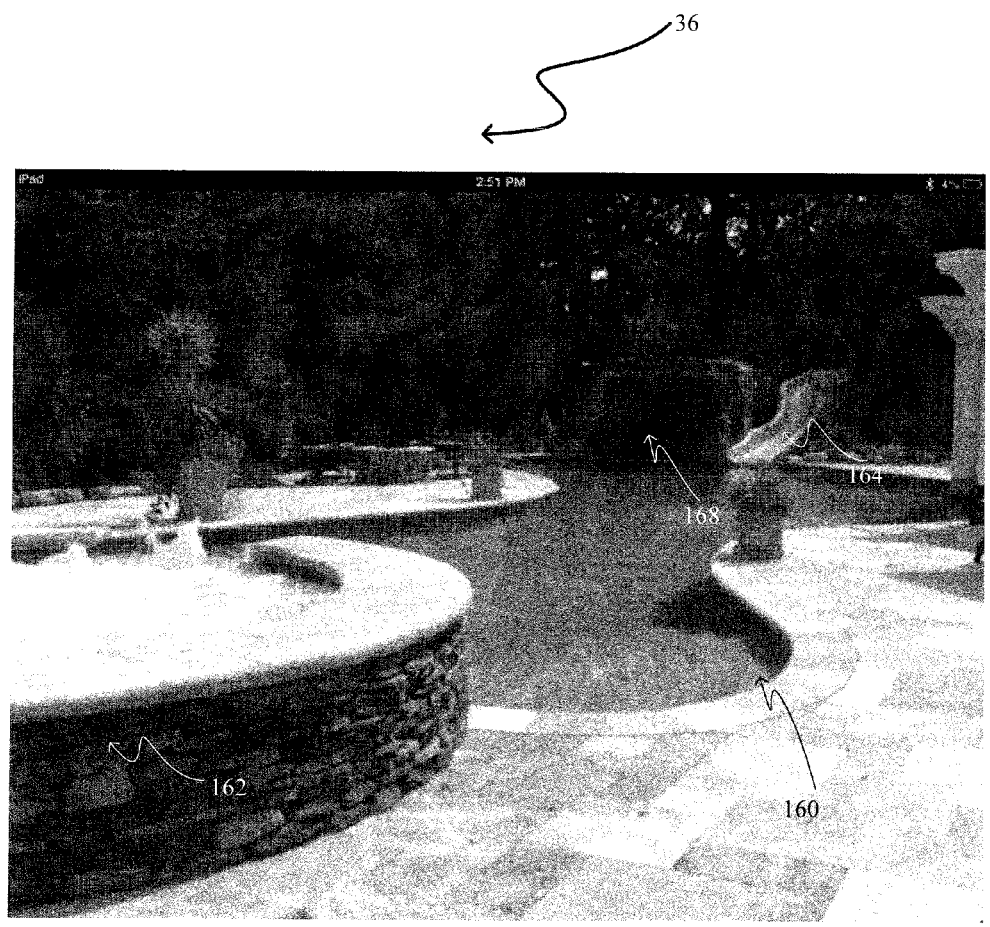

FIG. 5 shows a second device's 18 display screen 36 displaying a presentation that includes a swimming pool 160, waterfall structure 168, spa 162, and slide 164. In the setting shown in FIG. 5, all of the pool and spa functionalities are turned "off," and thus the media content does not depict water movement in the waterfall structure 168, spa 162, or slide 164. FIG. 6 shows the display screen 36 displaying a presentation comprising imagery of the swimming pool 160, waterfall structure 168, spa 162, and slide 164, but with pool and spa water features turned "on," as the media content shows water movement throughout the waterfall structure 168, spa 162, and slide 164. The demonstration of the pool water features turning on could be invoked via a user navigating the "water features" buttons 118, 120, 122, 126 shown in FIGS. 3-4. For example, tapping on the waterslide button 118 could prompt the display of water flowing down the depicted waterslide 164. Tapping on waterfall button 124 could prompt the display of water flowing down the depicted waterfall 168. Also, a user could use the waterfall control 126 to select the degree of waterflow in the depicted waterfall 168.

It is noted that the display screen 36 could display multiple media presentations relating to multiple features. Thus, as a user invokes multiple buttons and/or controls via the user interface 40, a plurality of media presentation could be displayed contemporaneously, which demonstrate various features corresponding to the multiple buttons and/or controls.

It is also noted that a "combo" media presentation could demonstrate several features operating simultaneously. For example, a "combo lighting" media presentation could demonstrate a lighting dimming feature, a lighting themes feature, a lighting color feature, etc. Also, a "combo water flow" media presentation could demonstrate various features of a water flow system, for example, a waterfall feature, a waterslide feature, a lazy river feature, a bubbler feature, etc. Also, the display screen 36 could display a media presentation which demonstrates features relating to a plurality of systems.

Figure 7:
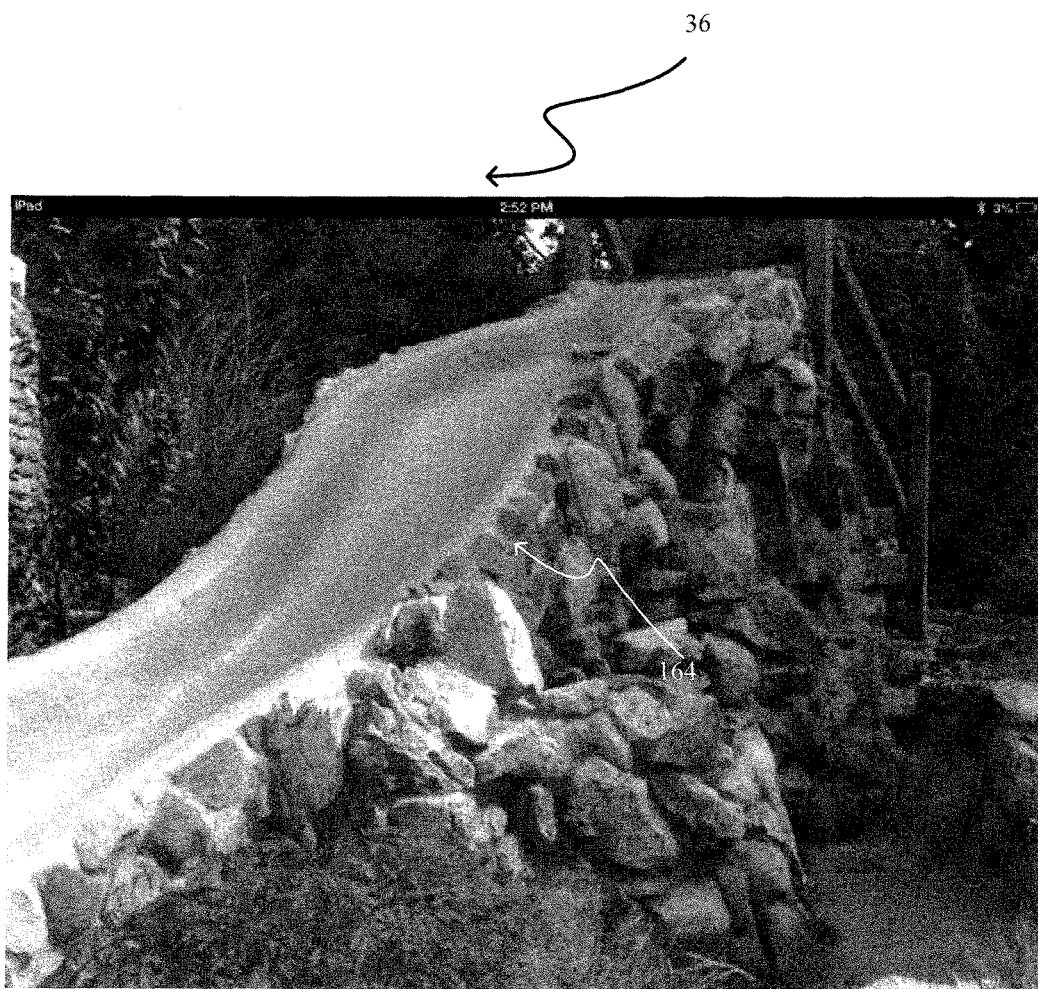

The display screen 36 could display multiple media presentations, wherein at least one of the multiple media presentations is a combo media presentation. Thus, a combo media presentation demonstrating a plurality of features could be displayed simultaneously with one or more other media presentations demonstrating one or more of the plurality of features. For example, a first portion of the display screen 36 (e.g., a first window) could present a combo water flow media presentation demonstrating a waterfall feature, a waterslide feature, a lazy river feature, and a bubbler feature, while a second portion of the display screen 36 (e.g., a second window) could present another media presentation demonstrating only the waterslide feature. Any number of other media presentations could be displayed contemporaneously. For example, a third portion of the display screen 36 could present a third media presentation demonstrating the waterfall feature, while a fourth portion of the display screen 36 could present a fourth media presentation demonstrating the lazy river feature, etc. The first media presentation could show an overview of the pool/spa environment (e.g., as shown in FIG. 6) while the second media presentation could show a more focused view of the individual feature (e.g., as shown in FIG. 7). The various portions could be displayed in any arrangement. For example, the second portion of the display screen 36 could be a second window contained within the first portion of the display screen 36. As another example, the second portion of the display screen 36 could be positioned adjacent to the first portion of the display screen 36.

Activating buttons and/or controls via the simulated control user interface 40 could cause the media presentation to focus on various locations within a swimming pool and spa setting.

Figure 8:
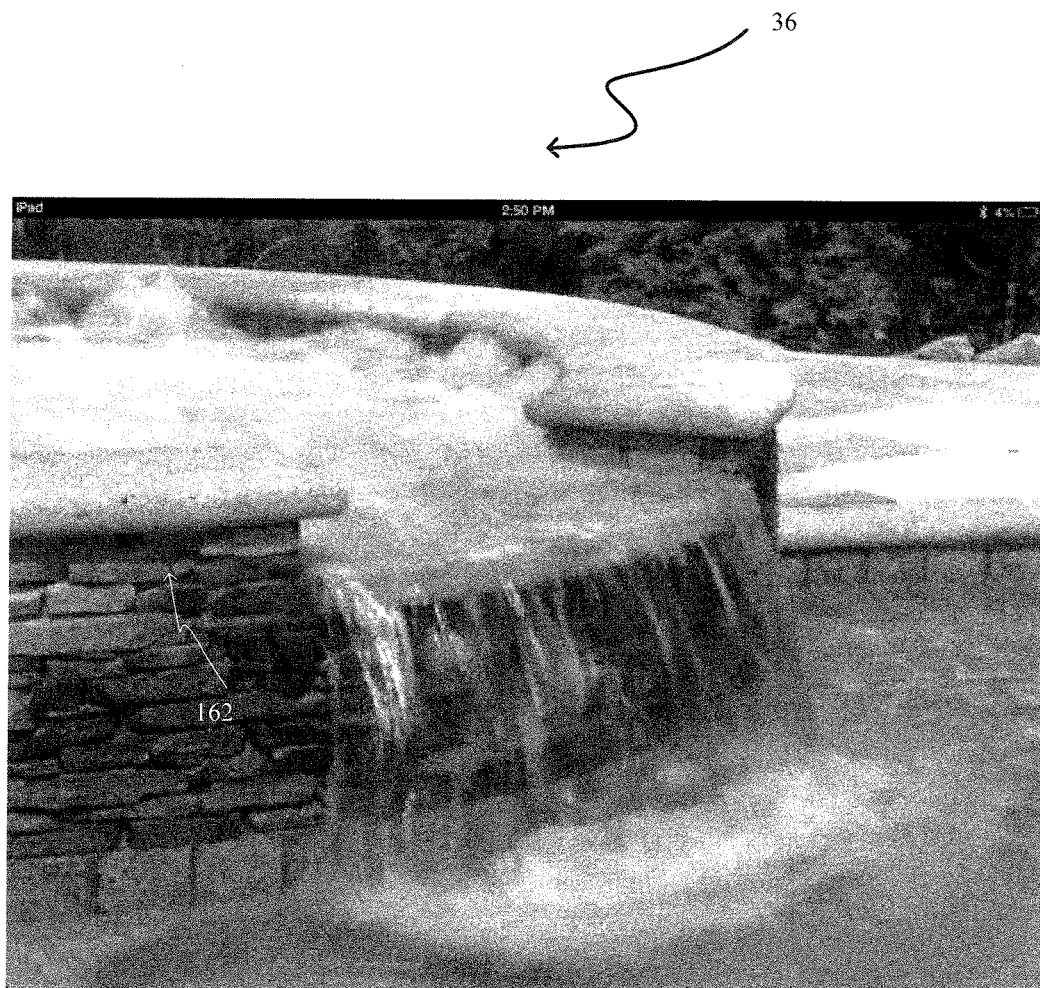

For example, tapping the waterslide button 118 could cause the media presentation to automatically "zoom in" on the waterslide 164, as shown in FIG. 7. Likewise, navigating the spa temperature control 104 (see FIG. 2) could cause the media presentation to automatically zoom in on the spa 162, as shown in FIG. 8. A user could also select locations within the swimming pool and spa setting on which he or she would like the media presentation to focus. For example, a user could also "zoom in" on the media presentation to view the water slide 164 in more detail, as shown in FIG. 7. A user could "zoom in" on the spa 162 in the media presentation and spa in more detail, as shown in FIG. 8.

Figure 9:
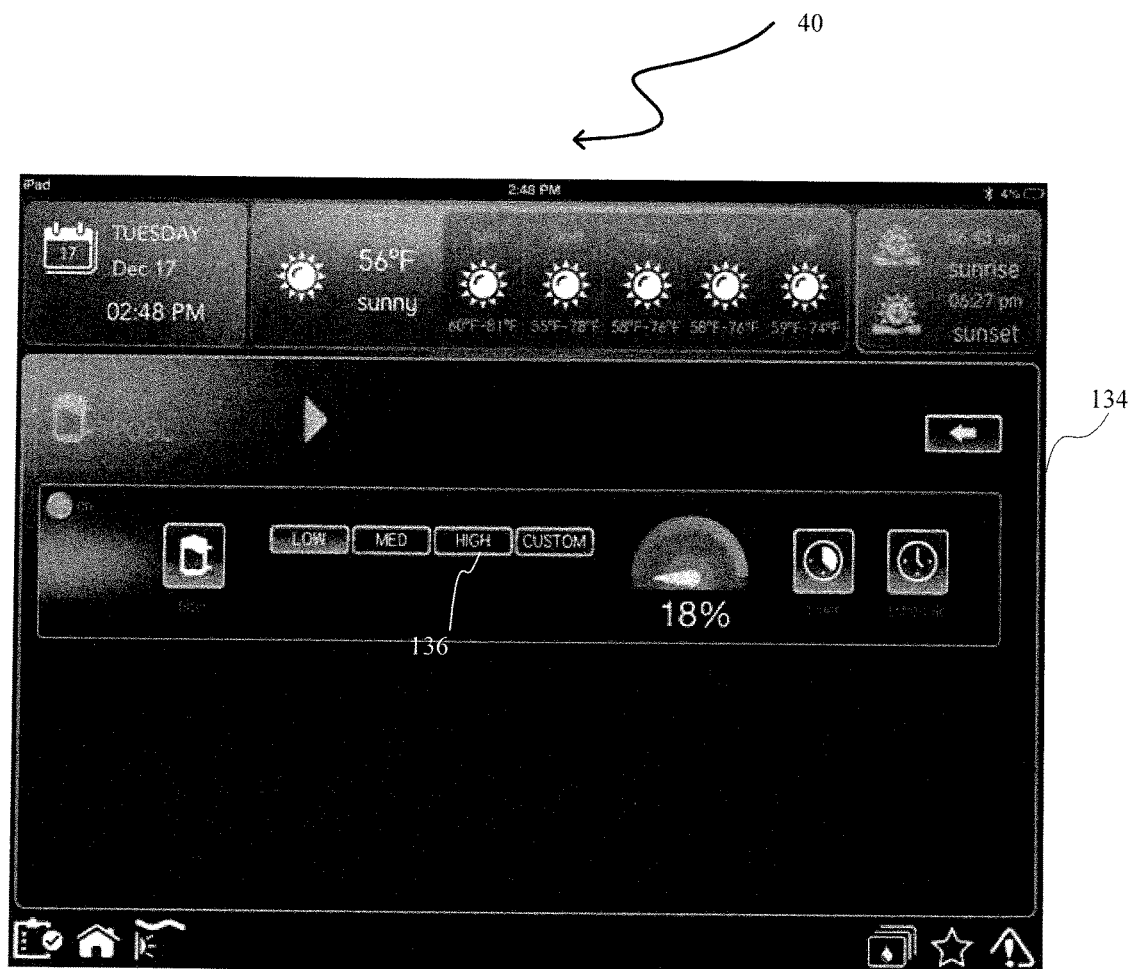

Returning to FIG. 2, the home screen 100 can include any number of buttons and/or controls. One area 130 of the home screen 100 could include buttons and/or controls relating to a swimming pool while another area 132 of the home screen could include buttons and/or controls 136 relating to a spa. Activation of a pool filter button (not shown) could prompt a pool filter screen 134 to be displayed, as depicted in FIG. 9. A user could navigate the pool filter screen 134 just as a pool-owner would navigate a pool/spa controller to adjust settings for a filter installed in a swimming pool. A user's activation of buttons and/or controls (e.g., 136) on the pool filter screen 134 could cause the second device 18 to present media presentations relating to pool filters and filtrations systems for sale.

Figure 10:
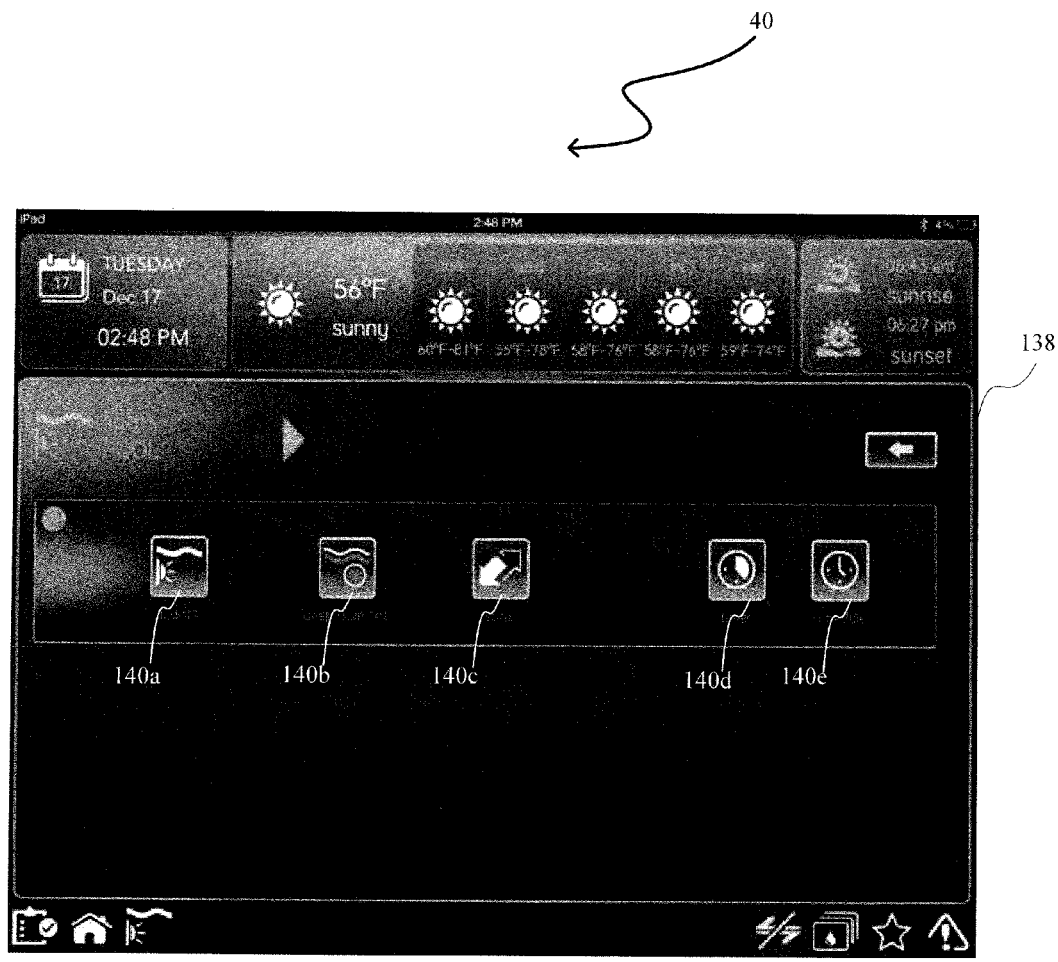
Figure 11:
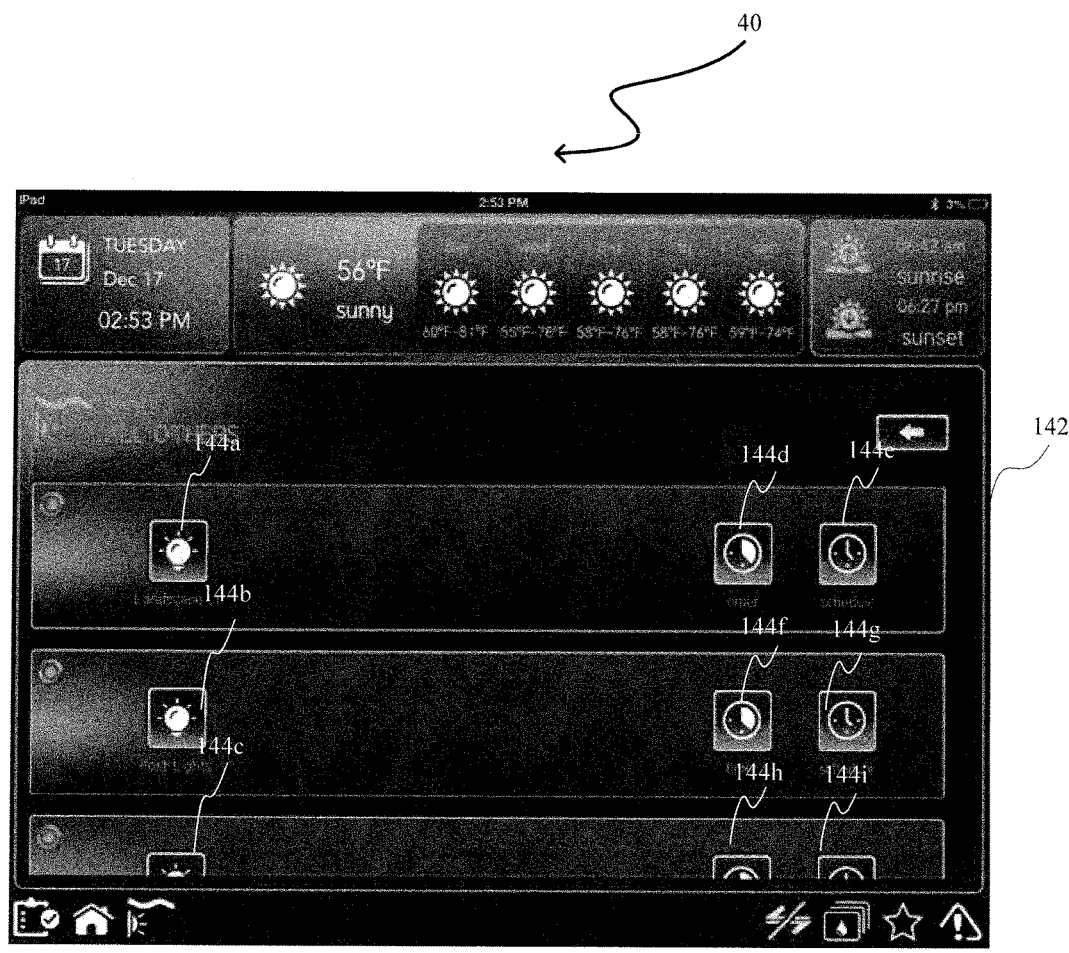
Figure 12:

Returning again to FIG. 2, the home screen 100 could include a "lights" button 114, activation of which could prompt the simulated control user interface 40 to display one or more lighting screens, as shown in FIGS. 10 and 11. FIG. 10 depicts a pool lighting screen 138, which simulates a pool/spa controller available for purchase. As a pool-owner would navigate buttons and/or controls on a pool/spa controller to configure existing lighting systems in a swimming pool, a user could navigate buttons and/or controls 140a-140e on the pool lighting screen 138. For example, using a pool/spa controller, a pool-owner would activate a lights button to turn pool lights on. Likewise, a user could activate the lights button 140a on the lighting screen 138 to prompt a media presentation showing pool lights turning on. For example, FIG. 12 shows the display screen 36 displaying a media presentation of the swimming pool 118 with a pool light 146 turned on.

FIG. 11 depicts a "surrounding lighting" screen 142, which simulates a surrounding lighting screen on a pool/spa controller. As a pool-owner would navigate buttons and/or controls on a pool/spa controller to configure existing lighting systems surrounding a swimming pool, a user could navigate buttons and/or controls 144a-144i on the surrounding lighting screen 142. For example, on a pool/spa controller, a user would activate the "post lights" button to turn post lights on. Likewise, a user could activate the "post lights" button 144b on the surrounding lighting screen 142 to prompt a media presentation showing post lights turning on. For example, FIG. 12 also shows the display screen 36 presenting a media presentation exhibiting the post lights 148 turned on.

Figure 13:
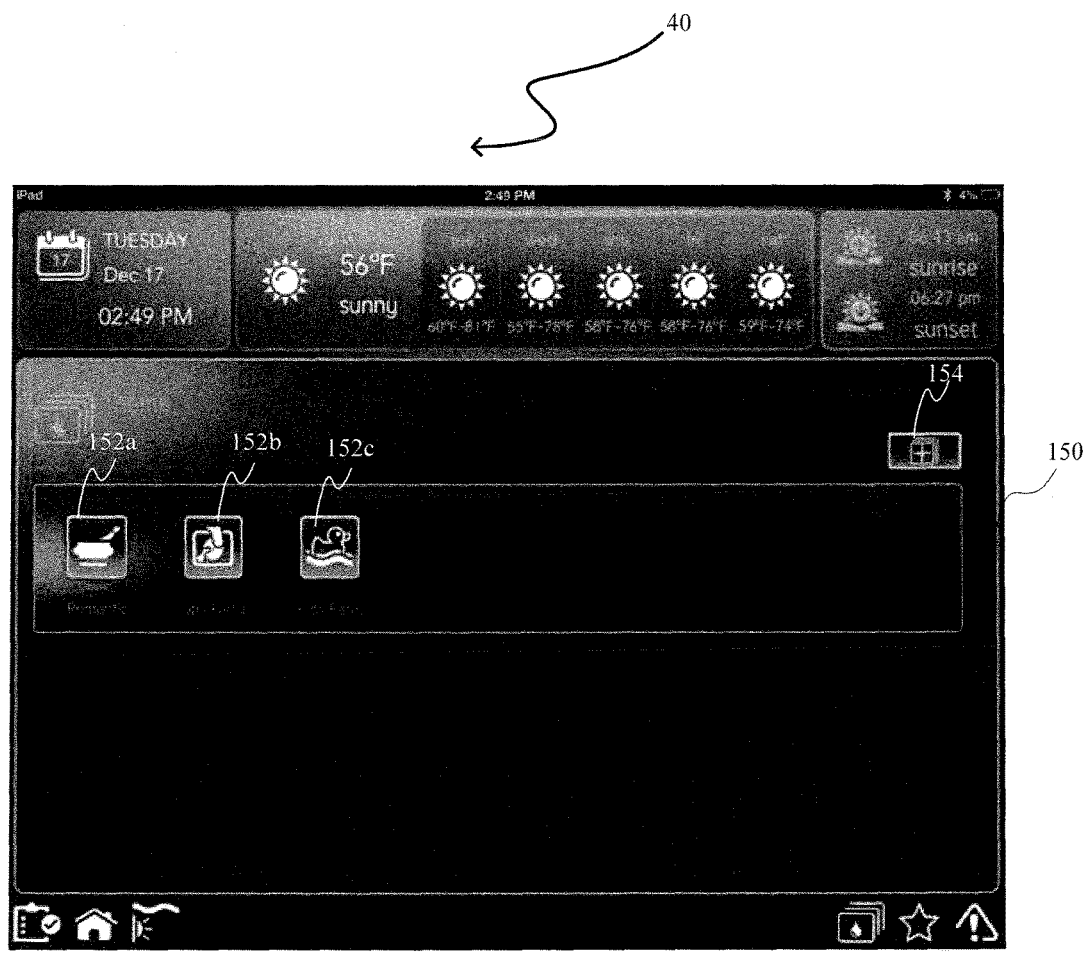
Figure 14:
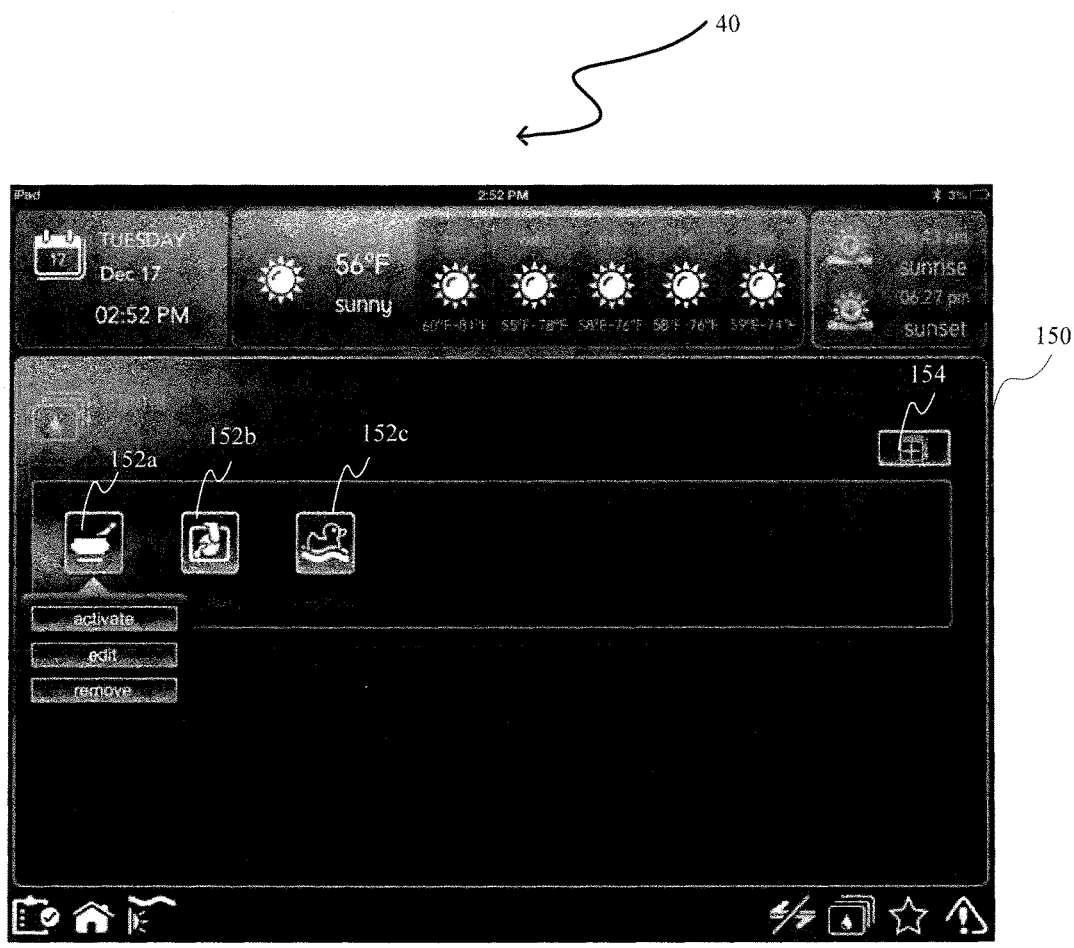

Returning again to FIG. 2, the home screen 100 could include a "themes" button 112, activation of which could prompt a themes screen 150, as shown in FIGS. 13 and 14. A theme could be associated with a preselected configuration for one or more pool/spa features. For example, a pool/spa controller for an installed swimming pool may allow a pool-owner to activate a theme button to automatically configure pool/spa features based on preselected settings. A spa party theme button could cause the waterfall to turn on, the spa temperature to turn to a high temperature, and the pool lights to turn a deep blue; while a kids party theme button could cause the waterfall to turn off, the spa temperature to turn to a low temperature, and the pool lights to turn multi-colored. A pool-owner would create themes via an "add theme button." As a pool-owner would use a pool/spa controller to create and activate themes for an existing swimming pool/spa, a user could navigate themes buttons 152a-152c on the themes screen 150 via the simulation control user interface 40. For example, as shown in FIGS. 13 and 14, a user could activate the "kids party" theme button 152c on the theme screen 150 to prompt a media presentation showing the waterfall turning off, the pool's thermometer indicating a lower temperature, and the pool lights becoming multi-colored. Such simulated themes could be created via a "create theme" button 154.

Figure 15:
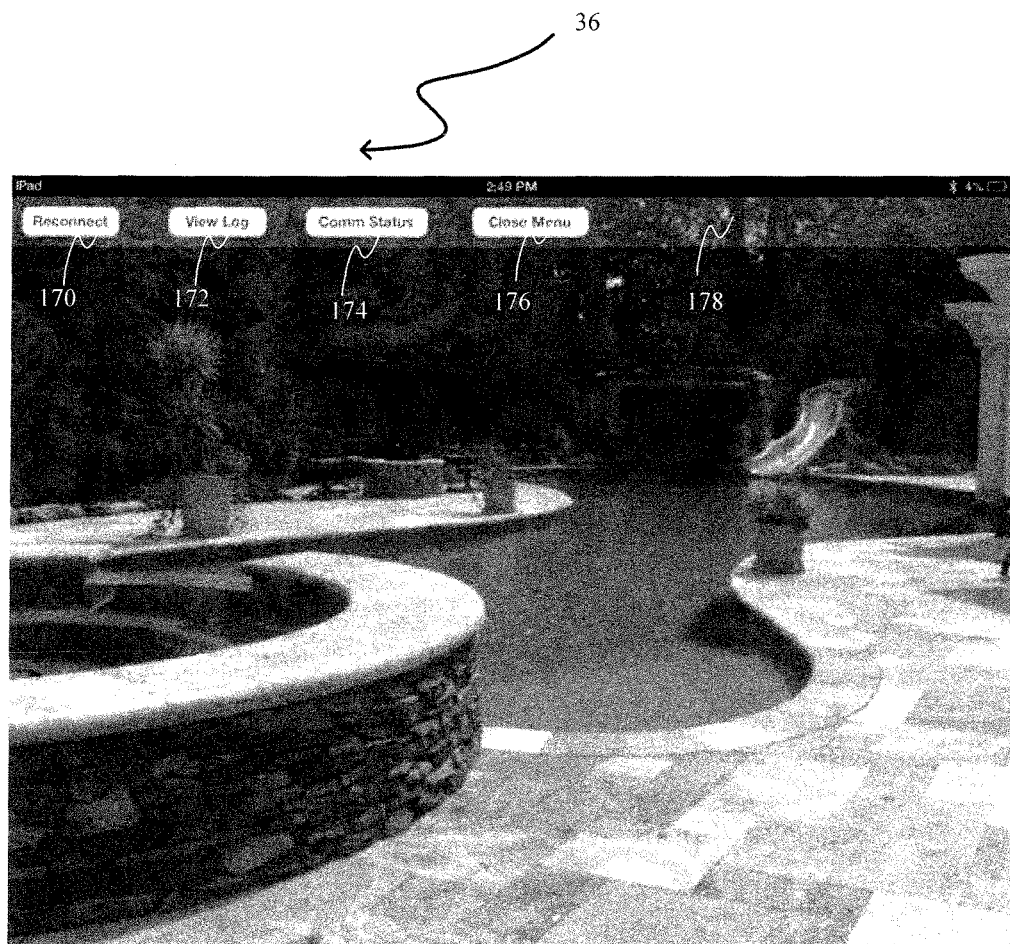

Now turning to FIG. 15, the second device 18 could receive user input via a menu 178 presented on the display screen 36. The menu 178 could be a user interface displayed along with a media presentation. The menu 178 could include various buttons, such as a reconnect button 170, a view log button 172, a communication status button 174, and a close menu button 176. The "reconnect" button 170 could prompt the second device 18 to reconnect with the first device 12 and/or with the simulation server 24. The "view log" 172 button could prompt display of an interface indicating client information and/or media presentations associated with the second device 18. The "communication status" button 174 could prompt display of an interface indicating connectivity between the second device 18 and the first device 12 and/or between the second device 18 and the simulation server 24. The "close menu" button 176 could discontinue presentation of the menu 178 on the display screen 36.

Figure 16:
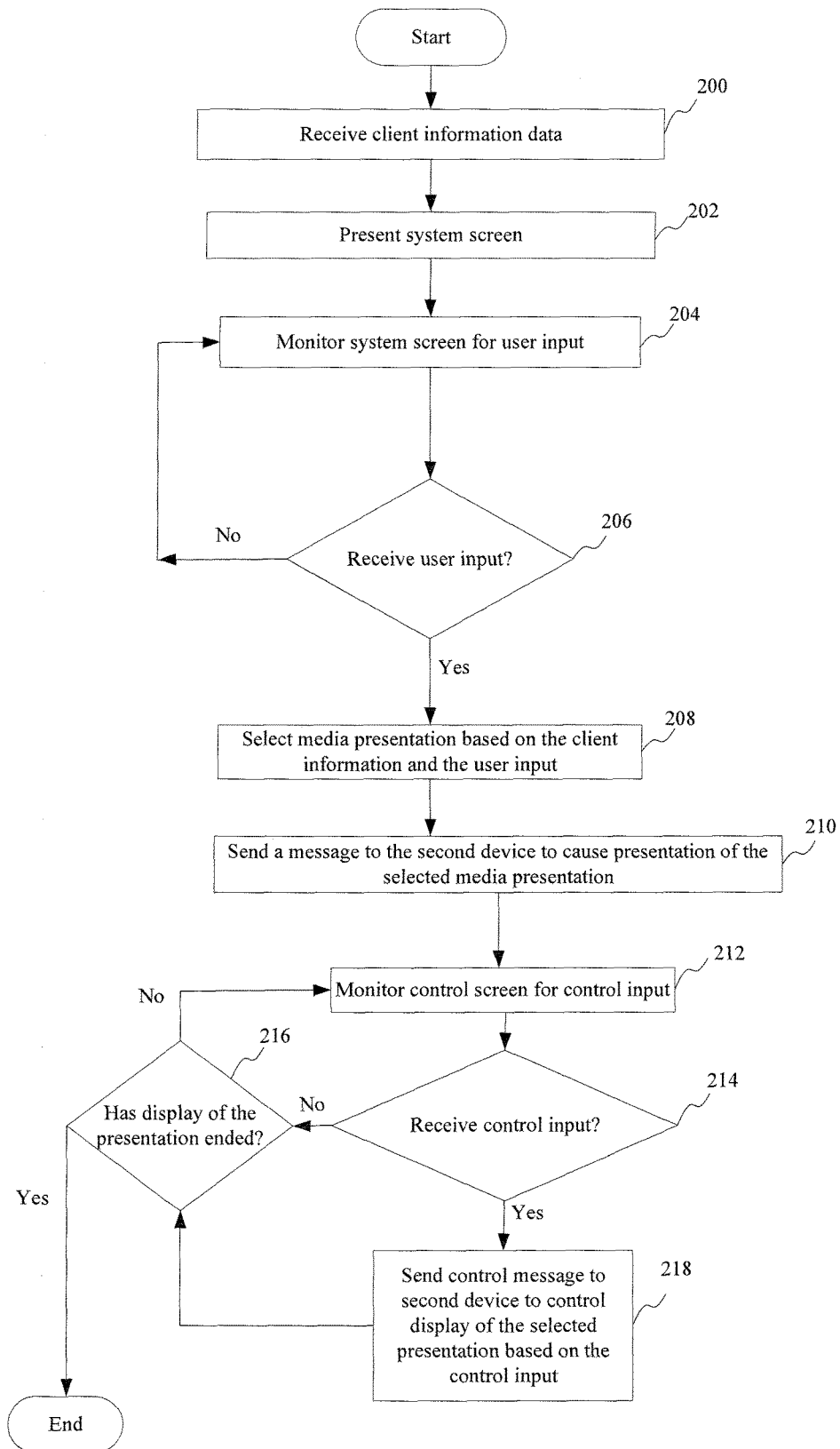
FIGS. 16-17 are flow-charts showing processing steps carried out by the system during a media presentation, according to an embodiment.

Turning now to FIG. 16, depicted is a flowchart showing processing steps that can be carried out by the first device 12 for causing a media presentation to be presented on the second device 18. In step 200, the first device 12 receives client information. The client information could be received via the first device's 12 user interface. The client information could also be received from the client information database 26. For example, when the first device 12 determines it is proximate to a particular customer's swimming pool location, the first device 12 could retrieve, via the network 34, client information associated with the particular client. In step 202, the first device presents a simulation control user interface 40 and displays a systems screen. In step 204, the first device monitors the systems screen for user input. In step 206, the first device 12 determines whether user input has been received. If the determination is negative, then the first device 12 continues monitoring for user input. Upon determining that user input has been received, the first device 12 proceeds to step 208 and selects a media presentation to be displayed on the second device 18 based on the client information and the user input.

A selection engine could select the presentation based on the client information and the user input. The presentation could be selected from a plurality of presentations stored in the media content database 28. For example, when the first device 12 determines it is in a location proximate to a particular customer's pool location, it could cause the simulation server 24 to establish a media library (e.g., within the media content database) containing a plurality of relevant presentations from the entire repository of presentations in the media content database 28. The plurality of relevant presentations may all be based on the particular customer's client information stored in the client information database 26 (e.g., they may all display systems for residential swimming pool and spas). As such, during the selection in step 208, rather than requiring the selection engine to sift through the entire repository of presentations in the media content database 28, the selection engine can analyze the library containing the plurality of relevant presentations to select an appropriate presentations based on the client information and the user input.

In step 210, the first device 12 sends a message to the second device 18 to cause display of the selected presentation. The message could include a unique identifier indicating the selected presentation. In step 212, the first device 12 monitors a control screen for control input. In step 214, the first device 12 determines whether control input is received. If the determination is negative, the first device 12 moves to step 216 and determines whether display of the presentation has ended. If the display of the presentation has ended, then the set of processing steps ends. If in step 216, the first device 12 determines that display of the presentation on the second device 18 has not ended, then the first device 12 continues to monitor the control screen for control input. Upon determining that control input has been received, the first device 12 transmits a control message to the second device 18 to control the presentation of the presentation. For example, in cases where the presentation is an application, the control message could communicate with the application's programming interface to control the presentation. The first device 12 then moves to step 216.

Figure 17:
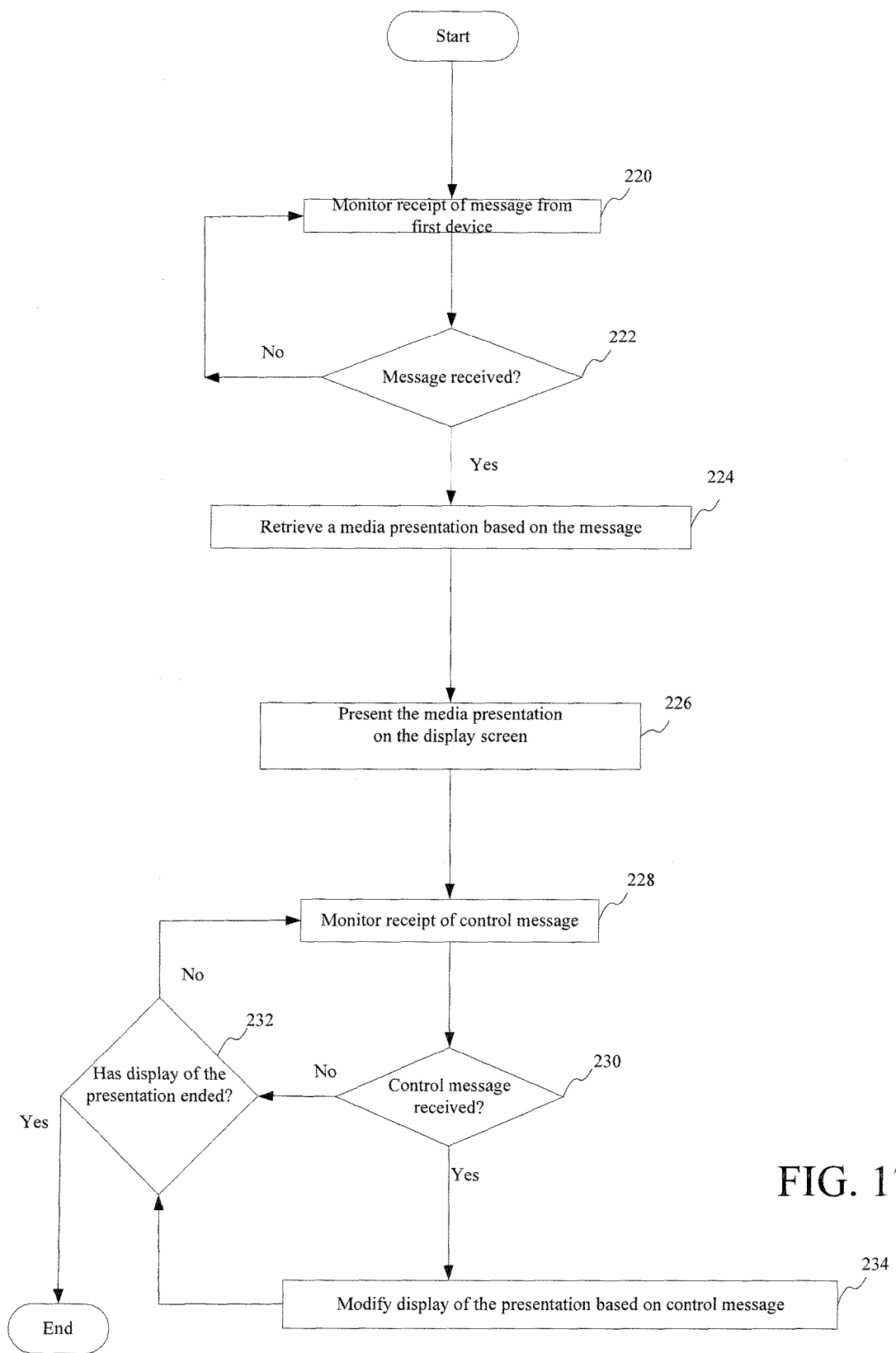

Turning now to FIG. 17, depicted is a flowchart showing processing steps performed by the second device 18 for presenting a media presentation. In step 220, the second device 18 monitors receipt of a message from the first device 12. In step 222, the second device 18 determines whether a message has been received. If the determination is negative, then the second device 18 continues to monitor receipt of a message from the first device 12. Upon determining that a message has been received from the first device 12, in step 224 the second device 18 retrieves a presentation based on the message. The second device 18 could retrieve the selected presentation based on a unique identifier contained in the message. In step 226, the second device 18 presents the presentation on the display screen 36. In step 228, the second device 18 monitors receipt of a control message from the first device 12. In step 230, the second device 18 determines whether a control message has been received. If the determination is negative, then in step 232 the second device 18 determines whether the display of the media presentation has ended. If the display has ended, then the set of processing steps ends. If the display of the presentation has not ended, then the second device 18 returns to step 228 and monitors receipt of a control message. When the second device 18 determines that a control message has been received, in step 234 the second device 18 modifies the display of the presentation based on the control message, and then proceeds to step 232. For example, in cases where the presentation is an application, the display of the presentation could be modified based on the control message communicating with the application's programming interface.

Figure 18:
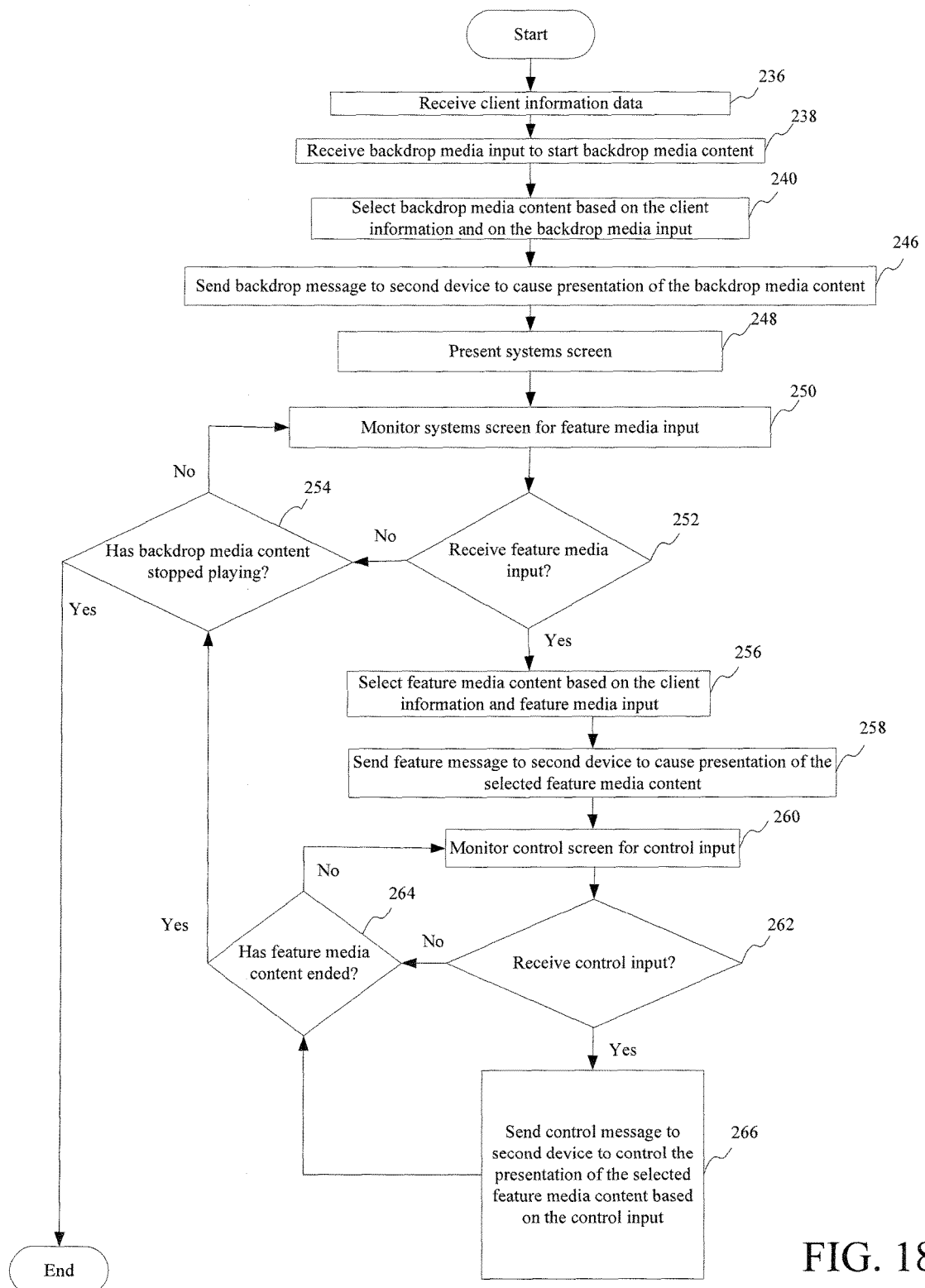
FIGS. 18-19 are flow-charts showing processing steps carried out by the system during a media presentation, according to another embodiment.

Turning now to FIG. 18, depicted is a flowchart showing another embodiment of processing steps carried out by the first device 12 for causing a media presentation to be presented on the second device 18. In this embodiment, the media presentation comprises a "backdrop media content" and one or more "feature media contents." In step 236, the first device 12 receives client information. In step 238, the first device 12 receives backdrop media input to start a backdrop media content on the second device 18. For example, a salesperson could activate a "start backdrop media content" button via the first device's 12 user interface.

In step 240, a selection engine selects a backdrop media content based on the client information and on the backdrop media input. The backdrop media content could be selected from a plurality of backdrop media contents in the media content database 28. For example, when the first device 12 determines it is in a location proximate to a particular customer's pool location, it could cause the simulation server 24 to establish a library (e.g., within the media content database 28) containing a plurality of relevant backdrop media contents from the media content database's 28 repository of backdrop media contents. The plurality of relevant backdrop media contents may all be based on the particular customer's client information stored in the client information database 26 (e.g., they may all display residential swimming pool and spas). In step 246, the first device 12 sends a backdrop message of the second device 18 to cause presentation of the selected backdrop media content. The backdrop message could include a unique identifier indicating the selected backdrop media content.

In step 248, the first device 12 presents a simulation control user interface 40 displaying a "systems screen." In step 250, the first device 12 monitors the systems screen for feature media input. In step 252, the first device 12 determines whether feature media input has been received. If the determination is negative, then in step 254 the first device 12 determines whether the backdrop media content has stopped playing on the second device 18 (e.g., by determining whether the second device 18 has transmitted a message to the first device 12 indicating that the backdrop media content has stopped playing). If the backdrop media content has stopped playing, then the set of processing steps ends. If, on the other hand, the first device 12 determines the backdrop media content has not stopped playing, then the first device 12 continues monitoring for features media input. Upon determining that features media input has been received, the first device 12 proceeds to step 256 and selects a features media content based on the client information and the features media input.

A selection engine could select a features media content based on the client information and on the features media input. The feature media content could be selected from a plurality of feature media contents stored in the media content database 28. For example, when the first device 12 determines it is in a location proximate to a particular customer's pool location, it could cause the simulation server 24 to establish a library (e.g., within the media content database) containing a plurality of relevant feature media contents from the entire repository of feature media contents in the media content database 28. The plurality of relevant feature media contents may all be based on the particular customer's client information stored in the client information database 26 (e.g., they may all display systems for residential swimming pool and spas).

In step 258, the first device 12 sends a feature message to the second device 18 to cause presentation of the selected feature media content. The feature message could include a unique identifier indicating the selected feature media content.

In step 260, the first device 12 monitors a control screen for control input. In step 262, the first device 12 determines whether control input is received. If the determination is negative, the first device 12 moves to step 264 and determines whether the feature media content has ended. If the feature media content has ended, then the first device 12 moves to step 254 and determines whether the backdrop media content has ended. If in step 264, the first device 12 determines that the feature media content has not yet stopped playing on the second device 18, then the first device 12 continues to monitor the control screen for control input. Upon determining that control input has been received, in step 266 the first device 12 transmits a control message to the second device 18 to control the presentation of the selected feature media content.

Figure 19:
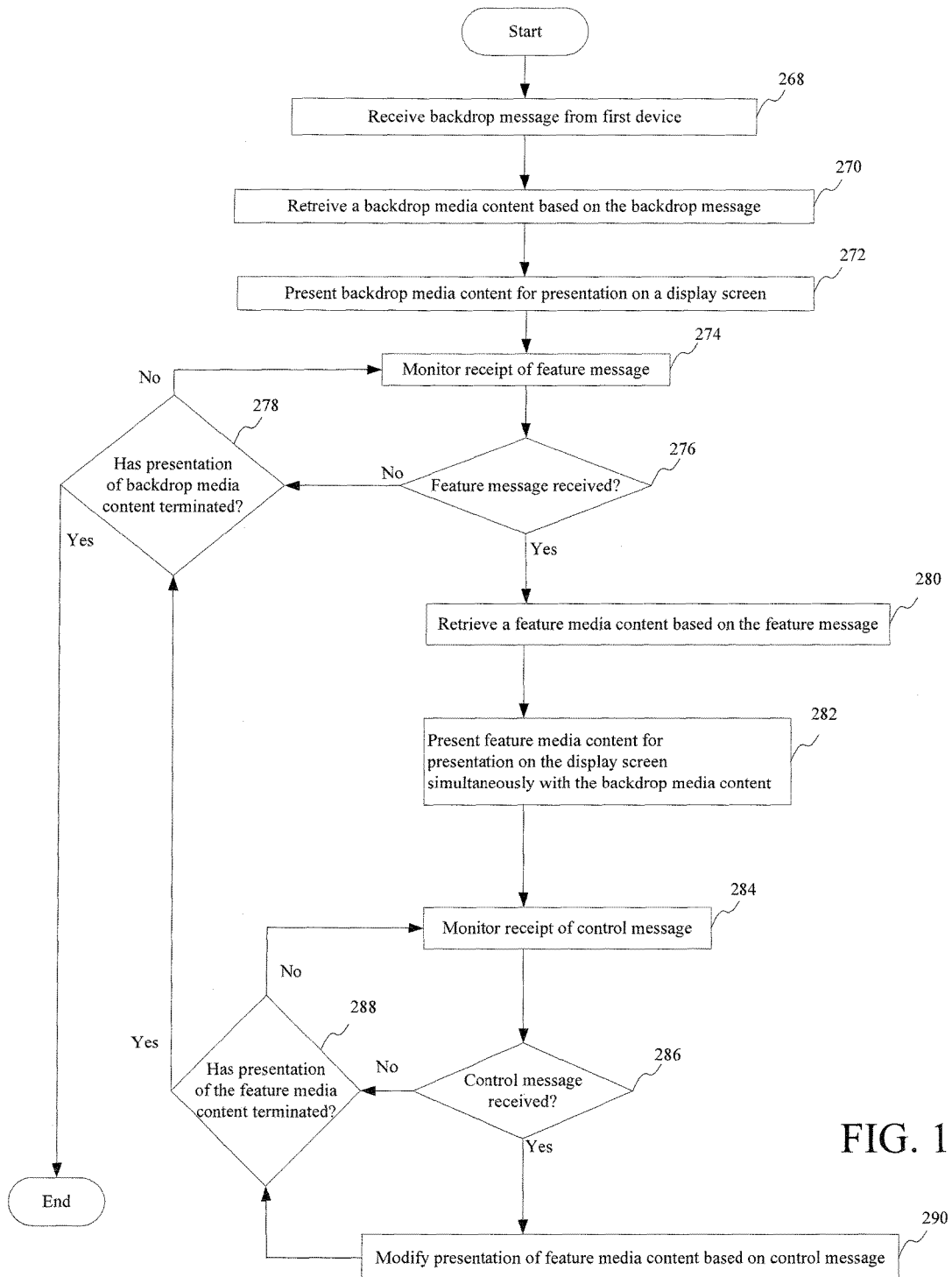

Turning now to FIG. 19, depicted is a flowchart showing another embodiment of processing steps performed by the second device 18 for presenting a media presentation. Similar to the processing steps of FIG. 18, in this embodiment, the media presentation comprises a "backdrop media content" and one or more "feature media contents." In step 268, the second device 18 receives a backdrop message from the first device 12. In step 270, the second device 18 processes the backdrop message to retrieve a backdrop media content (e.g., from the library within the media content database 28). In step 272, the second device 18 presents the backdrop media content for presentation on the display screen 36. In step 24, the second device 18 monitors receipt of a feature message. In step 276, the second device 18 determines whether a feature message has been received. If the determination is negative, then in step 278 the second device 18 determines whether the presentation of the backdrop media content has ended. If the second device 18 determines that the presentation has ended, then the set of processing steps ends. If in step 278 the second device 18 determines the backdrop media presentation has not yet ended, then the second device 18 continues to monitor receipt of a feature message. Upon determining that a feature message has been received from the first device 12, in step 280 the second device 18 retrieves a feature media content based on the feature message. The second device 18 could retrieve the selected feature media content based on a unique identifier contained in the feature message. In step 282, the second device 18 presents the retrieved feature media content on the display screen 36 simultaneously with the backdrop media content. In step 284, the second device 18 monitors receipt of a control message from the first device 12. In step 286, the second device 18 determines whether a control message has been received. If the determination is negative, then in step 288 the second device 18 determines whether the presentation of the feature media content has ended. If such presentation has ended, then the second device 18 moves to step 278. If such presentation has not ended, then the second device 18 continues to monitor receipt of a control message. When the second device 18 determines that a control message has been received, in step 290 the second device 18 modifies the presentation of the feature media content based on the control message, and then moves to step 288.

Figure 20:
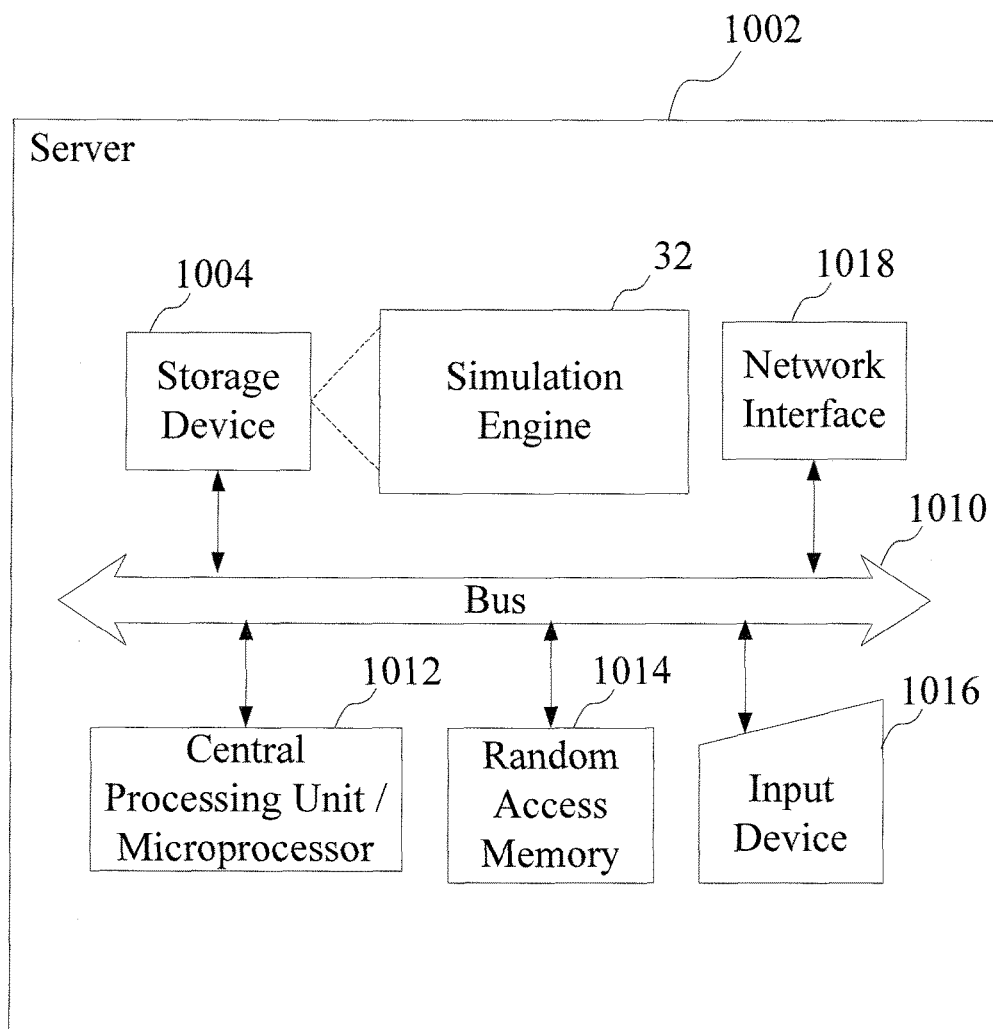
FIG. 20 is a diagram showing hardware and software components of the system.

FIG. 20 is a diagram showing hardware and software components of a computer system 12 on which the system of the present disclosure could be implemented. The system 12 comprises a processing server 1002 which could include a storage device 1004, a network interface 1018, a communications bus 1010, a central processing unit (CPU) (microprocessor) 1012, a random access memory (RAM) 1014, and one or more input devices 1016, such as a keyboard, mouse, etc. The server 1002 could also include a display (e.g., liquid crystal display (LCD), cathode ray tube (CRT), etc.). The storage device 1004 could comprise any suitable, computer-readable storage medium such as disk, non-volatile memory (e.g., read-only memory (ROM), erasable programmable ROM (EPROM), electrically-erasable programmable ROM (EEPROM), flash memory, field-programmable gate array (FPGA), etc.). The server 1002 could be a networked computer system, a personal computer, a smart phone, tablet computer etc. It is noted that the server 1002 need not be a networked server, and indeed, could be a stand-alone computer system.

The functionality provided by the present disclosure could be provided by a simulation engine 32, which could be embodied as computer-readable program code stored on the storage device 1004 and executed by the CPU 1012 using any suitable, high or low level computing language, such as Python, Java, C, C++, C#, .NET, MATLAB, etc. The network interface 1018 could include an Ethernet network interface device, a wireless network interface device, or any other suitable device which permits the server 1002 to communicate via the network. The CPU 1012 could include any suitable single- or multiple-core microprocessor of any suitable architecture that is capable of implementing and running the simulation 1006 (e.g., Intel processor). The random access memory 1014 could include any suitable, high-speed, random access memory typical of most modern computers, such as dynamic RAM (DRAM), etc.

Having thus described the system and method in detail, it is to be understood that the foregoing description is not intended to limit the spirit or scope thereof. It will be understood that the embodiments of the present disclosure described herein are merely exemplary and that a person skilled in the art may make any variations and modification without departing from the spirit and scope of the disclosure. All such variations and modifications, including those discussed above, are intended to be included within the scope of the disclosure.

What is claimed is:

1. A first device for communicating with a second device to present a sales media demonstration:

the first device comprising of:
a first electronic display;
a first processor; and
a first memory, wherein the first memory when executed by the first processor is configured to:
display a control user interface simulating a pool/spa controller user interface on the first electronic display of the first device including a plurality of buttons and/or controls;
allow a user to interact with the control user interface at the first device and operate simulated controls of the pool/spa controller user interface at the first device;
receive, via the control user interface, a first input activating a first button and/or control of the plurality of buttons and/or controls relating to a first at least one pool/spa system component available for purchase, wherein the first button and/or control is associated with one or more data tags; and
generate and send a first media content message associated with the one or more data tags, to the second device based on the first input, wherein the first media content message controls a first media presentation displayed on a second electronic display of the second device and relating to the first at least one pool/spa system component; and the second device comprising of:
the second electronic display;
a second processor; and
a second memory, wherein the second memory when executed by the second processor is configured to:
receive the first media content message; and
display, via the second electronic display, the first media presentation comprising of a simulated pool or spa environment, and the first media presentation contemporaneously displaying operation of the at least one pool/spa system component in the simulated pool or spa environment in response to the user interaction with the control user interface at the first device, wherein the at least one pool/spa component includes a heater, a filtration system, a light, a chlorinator, a sanitizer, a pH controller, an oxidation reduction potential controller, a valve actuator, a water feature, or a pool cleaner.

2. The first device as claimed in claim 1, further configured to,
receive, via the control user interface, a second input activating a second button and/or control of the plurality of buttons and/or controls relating to a second at least one pool/spa component available for purchase; and
send a second media content message to the second device based on the second input, wherein the second device presents a second media presentation contemporaneously with the first media presentation, the second media presentation relating to the second at least one pool/spa component.

3. The first device as claimed in claim, 1, further configured to,
receive, via the control user interface, a second input activating a second button and/or control of the plurality of buttons and/or controls; and
send a second media content message to the second device based on a second received input, wherein the second device presents a second media presentation contemporaneously with the first media presentation, the second media presentation relating to the first at least one pool/spa system component and one or more second pool/spa system components.

4. The first device as claimed in claim 1, wherein the first media content message is based on information associated with a client.

5. The first device as claimed in claim 1, wherein the first device is communicatively coupled to the second device via at least one of tethering, 3G communication, 4G communication, or radio frequency communication.

6. The first device as claimed in claim 1, wherein the first device is configured to communicate with an actuator interface for controlling at least one installed pool/spa system component.

7. The first device as claimed in claim 1, wherein the control user interface can be reconfigured to modify the plurality of buttons and/or controls.

8. A method of presenting a sales media demonstration, comprising the steps of:
displaying, by a first device, a control user interface simulating a pool/spa controller user interface on a first electronic display of the first device including a plurality of buttons and/or controls;
allowing a user to interact with the control user interface at the first device and operate simulated controls of the pool/spa controller user interface at the first device;
receiving, by the first device via the control user interface, a first input activating a first button and/or control of the plurality of buttons and/or controls, wherein the first button and/or control relates to a first pool/spa system component available for purchase and is associated with one or more data tags;
generating and sending, by the first device, a first media content message associated with the one or more data tags, to a second device based on the first input, wherein the first media content message controls a first media presentation displayed on a second electronic display of the second device and relating to the first pool/spa system component;
receiving, by the second device, the first media content message; and
displaying, by the second device via the second electronic display, the first media presentation comprising of a simulated pool or spa environment, and the first media presentation contemporaneously displaying operation of the at least one pool/spa system component in the simulated pool or spa environment in response to the user interaction with the control user interface at the first device, wherein the at least one pool/spa component includes a heater, a filtration system, a light, a chlorinator, a sanitizer, a pH controller, an oxidation reduction potential controller, a valve actuator, a water feature, or a pool cleaner.

9. The method as claimed in claim 8, further comprising:
receiving, by the first device, a second input activating a second button and/or control of the plurality of buttons and/or controls relating to a second at least one pool/spa component available for purchase; and
sending, by the first device, a second media content message to the second device based on the second input, wherein the second device presents a second media presentation contemporaneously with the first media presentation, the second media presentation relating to the second at least one pool/spa component.

10. The method as claimed in claim 8, further comprising,
receiving, by the first device, a second input activating a second button and/or control of the plurality of buttons and/or controls; and
sending, by the first device, a second media content message to the second device based on a second received input, wherein the second device presents a second media presentation contemporaneously with the first media presentation, the second media presentation relating to the first at least one pool/spa system component and one or more second pool/spa system components.

11. The method as claimed in claim 8, wherein the first device is communicatively coupled to the second device via at least one of tethering, 3G communication, 4G communication, or radio frequency communication.

12. The method as claimed in claim 8, further comprising:
sending, by the first device, data to an actuator interface for controlling at least one installed pool/spa system component.

13. The method as claimed in claim 8, further comprising:
processing information associated with a client to select the first media content message.

14. A non-transitory computer readable medium for providing a sales demonstration, comprising:
instruction code for displaying, by a first device, a control user interface simulating a pool/spa controller user interface on a first electronic display of the first device including a plurality of buttons and/or controls;
instruction code for allowing a user to interact with the control user interface at the first device and operate simulated controls of the pool/spa controller user interface at the first device;
instruction code for receiving, by the first device via the control user interface, a first input activating a first button and/or control of the plurality of buttons and/or controls, wherein the first button and/or control relates to a first at least one pool/spa system component available for purchase and is associated with one or more data tags;

instruction code for generating and sending, by the first device, a first media content message associated with the one or more data tags, to a second device based on the first input, wherein the first media content message controls a first media presentation displayed on a second electronic display of the second device and relating to the first at least one pool/spa system component;

instruction code for receiving, by the second device, the first media content message; and instruction code for displaying, by the second device via the second electronic display, the first media presentation comprising of a simulated pool or spa environment, and the first media presentation contemporaneously displaying operation of the at least one pool/spa system component in the simulated pool or spa environment in response to the user interaction with the control user interface at the first device, wherein the at least one pool/spa component includes a heater, a filtration system, a light, a chlorinator, a sanitizer, a pH controller, an oxidation reduction potential controller, a valve actuator, a water feature, or a pool cleaner.

15. The non-transitory computer readable medium as claimed in claim 14, further comprising:

instruction code for receiving, by the first device, a second input activating a second button and/or control of the plurality of buttons and/or controls relating to a second at least one pool/spa component available for purchase; and instruction code for sending, by the first device, a second media content message to the second device based on the second input, wherein the second device presents a second media presentation contemporaneously with the first media presentation, the second media presentation relating to the second at least one pool/spa component.

16. The non-transitory computer readable medium as claimed in claim 14, further comprising:

instruction code for receiving, by the first device, a second input activating a second button and/or control of the plurality of buttons and/or controls; and instruction code for sending, by the first device, a second media content message to the second device based on a second received input, wherein the second device presents a second media presentation contemporaneously with the first media presentation, the second media presentation relating to the first at least one pool/spa system component and one or more second pool/spa system components.

17. The non-transitory computer readable medium as claimed in claim 14, wherein the first device is communicatively coupled to the second device via at least one of tethering, 3G communication, 4G communication, or radio frequency communication.

18. The non-transitory computer readable medium as claimed in claim 14, further comprising:

instruction code for sending, by the first device, data to an actuator interface for controlling at least one installed pool/spa system component.

19. The non-transitory computer readable medium as claimed in claim 14, further comprising:

instruction code for selecting the first media content message based on processing information associated with a client.

* * * * *